United States Patent [19]
Takagi

[11] Patent Number: 5,448,330
[45] Date of Patent: Sep. 5, 1995

[54] DIVIDED RADIATION TYPE FLASHLIGHT SYSTEM

[75] Inventor: Tadao Takagi, Yokohama, Japan

[73] Assignee: Nikon Corporation, Tokyo, Japan

[21] Appl. No.: 232,349

[22] Filed: Apr. 22, 1994

Related U.S. Application Data

[63] Continuation of Ser. No. 899,444, Jun. 16, 1992, abandoned.

[30] Foreign Application Priority Data

| Jun. 20, 1991 | [JP] | Japan | 3-176138 |
| Jun. 20, 1991 | [JP] | Japan | 3-176139 |
| Oct. 9, 1991 | [JP] | Japan | 3-290768 |
| Oct. 18, 1991 | [JP] | Japan | 3-298016 |

[51] Int. Cl.⁶ .................. G03B 13/36; G03B 15/05
[52] U.S. Cl. .................. 354/402; 354/415; 354/416
[58] Field of Search .......... 354/402, 403, 413, 415, 354/432, 132, 145.1, 416; 362/16, 18

[56] References Cited

U.S. PATENT DOCUMENTS

| 4,085,316 | 4/1978 | Quinn | 362/16 |
| 4,457,602 | 7/1984 | Mizokami | 354/145.1 X |
| 4,470,684 | 9/1984 | Harvey | 354/413 |
| 4,501,481 | 2/1985 | Kataoka et al. | 354/415 X |
| 4,527,880 | 7/1985 | Okino | 354/403 |
| 4,692,013 | 9/1987 | Okino | 354/413 |
| 4,816,854 | 3/1989 | Tsuji et al. | 354/132 X |
| 4,941,009 | 7/1990 | Yoshida | 354/402 |
| 5,164,759 | 11/1992 | Yasukawa | 354/415 |

FOREIGN PATENT DOCUMENTS 63-115148  5/1988  Japan .

Primary Examiner—W. B. Perkey
Attorney, Agent, or Firm—Shapiro and Shapiro

[57] ABSTRACT

A divided radiation type flashlight system comprises a light emission port, a distance measuring instrument for measuring distances from multiple domains of a field, a calculator for calculating quantitites of weighting the amounts of radiation light originating from the light emission port for distance measuring domains using distance measuring information of multiple distance measuring domains the distance measuring instrument provides, then outputting the calculated quantities, and a weighting unit for weighting radiation light originating from the light emission port for distance measuring domains according to the calculated quantities of weight.

35 Claims, 32 Drawing Sheets

DIVIDED RADIATION TYPE FLASHLIGHT SYSTEM

This is a continuation of application Ser. No. 07/899,444 filed Jun. 16, 1992, now abandoned.

BACKGROUND OF THE INVENTION

1. Field of the Invention

The present invention relates to a divided radiation type flashlight system for changing the light distribution of a flash emitted according to the distribution of subjects in a field, a divided radiation type flashlight, and a camera capable of loading the divided radiation type flashlight.

2. Related Background Art

In a well-known divided radiation type flashlight, light distribution is controlled according to the spatial distribution of subjects (disclosed in, for example, Japanese Patent Application Laid-Open No. 63-115148). The flashlight includes multiple flash tubes, and controls emission and non-emission of the flash tubes to radiate different domains of an object scene to be photographed.

However, the conventional divided radiation type flashlight mentioned above poses the problems below.
(1) Since multiple flash tubes and multiple light distribution optical system associated with the multiple flash tubes are required, a whole flashlight is large and heavy.
(2) Since multiple flash tubes emit light, a large amount of energy is consumed. Continuous operation increases an amount of heat dissipated.
(3) Since multiple flash tubes and multiple light distribution optical system associated with the multiple flash tubes are required, overlapping or missing radiation occurs on the borders of divided domains. This causes irregular light distribution.
(4) Light adjustment devices must be installed to adjust light of multiple flash tubes. This results in complex control.

SUMMARY OF THE INVENTION

An object of the present invention is to provide a divided radiation type flashlight system capable of controlling light distribution using a single flash tube and thereby solving the problems the prior art poses, a camera capable of loading a divided radiation type flashlight, and a divided radiation type flashlight.

Another object of the present invention is to provide a divided radiation type flashlight system using a single flash tube and controlling light distribution in a field according to the distribution of subjects in the field, a divided radiation type flashlight, and a camera capable of loading the divided radiation type flashlight.

Another object of the present invention is to provide a divided radiation type flashlight system capable of controlling the light distribution of a flash originating from a single flash tube according to the spatial distribution of subjects even when the light distribution angle of a flashlight differs from the angle of view of a photographic lens, and a camera capable of loading a divided radiation type flashlight.

DESCRIPTION OF THE PREFERRED EMBODIMENTS

Embodiments of the present invention will be described in conjunction with the drawings.

Figure 1:
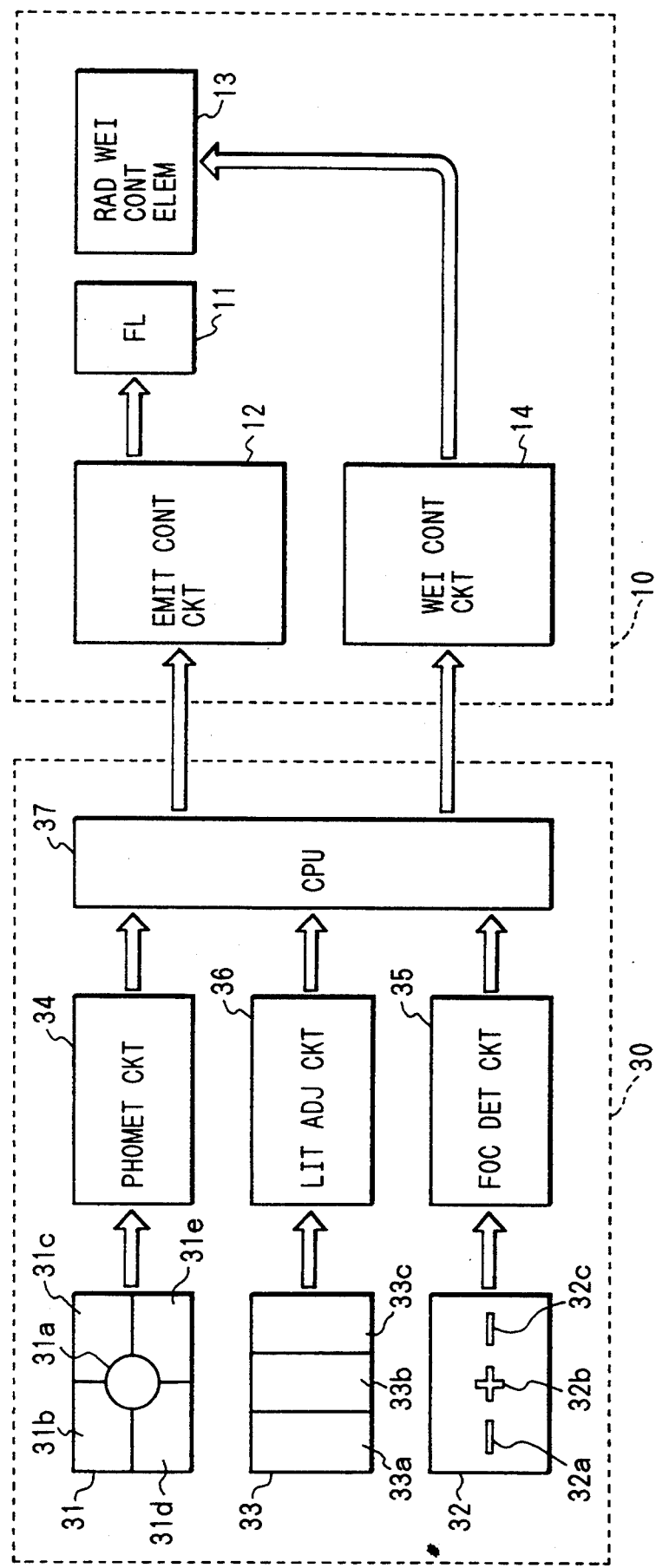
FIG. 1 is a block diagram showing an overall configuration.

In FIG. 1 showing an embodiment, a divided radiation type flashlight system comprises a light emission port 11, distance measuring means 32 and 35 for measuring distances from multiple distance measuring domains of a field, a calculating means 37 for calculating the quantities of weighting amounts of radiation light originating from the light emission port 11 for the distance measuring domains using distance measurement information of the multiple distance measuring domains the distance measuring means 32 and 35 provide, and weighting means 13 and 14 for weighting the radiation light originating from the light emission port 11 for the distance measuring domains according to the provided quantities of weight. Thereby, the problems of prior art are resolved.

A camera in FIG. 1 can load a divided radiation type flashlight having a light emission port 11 and weighting means 13 and 14 for weighting radiation light originating from the light emission port 11 for multiple radiation domains according to predetermined quantities of weight. The camera further comprises distance measuring means 32 and 35 for measuring distances from multiple distance measuring domains of a field, a calculating means 37 for calculating the quantities of weighting amounts of radiation light originating from the light emission port 11 for the distance measuring domains using the distance measurement information of multiple distance measuring domains the distance measuring means 32 and 33 provide, then outputting the calculated quantities, and a control means 37 for controlling the weighting means 13 and 14 so that the radiation light originating from the light emission port 11 will be weighted for distance measuring domains according to the calculated quantities of weight.

A divided radiation type flashlight includes a light emission port 11, and weighting means 13 and 14 for weighting radiation light originating from the light emission port 11 for multiple domains according to predetermined quantities of weight. The weighting means 13 or 14 inputs quantities of weight determined using the measured outputs provided by measuring distances from multiple distance measuring domains of a field, then weights radiation light according to the provided quantities of weight.

A calculating means 37 uses the distance measurement information of multiple distance measuring domains sent from distance measuring means 32 and 35 to calculate the quantities of weighting amounts of radiation light originating from a light emission port 11 for the distance measuring domains, then outputs the calculated quantities of weight. Weighting means 13 and 14 weight the radiation light originating from the light emission port for the distance measuring domains according to the provided quantities of weight. Thereby, in a divided radiation flashlight system, a single flash tube is employed, and still distribution of amounts of radiation light can be varied depending on arrangement of subjects (for example, FIGS. 9 to 11). Thus, the subjects can be illuminated uniformly.

A camera capable of loading a divided radiation type flashlight provides the same functions and effects as those described above.

When the flashlight is loaded on a camera, the same functions and effects as described above can be provided.

An embodiment of the present invention will be described in conjunction with FIGS. 1 to 13.

FIG. 1 is a control block diagram of a camera loading a divided radiation type flashlight. 10 denotes a divided radiation type flashlight. 30 denotes a camera accommodating or loading the flashlight. The flashlight 10 comprises a well-known flash tube 11, an emission control circuit 12 for controlling light emission of the flash tube 11, a radiation light weighting control element 13 arranged forward of the flash tube 11, and a control circuit 14 for controlling the weighting control element 13.

Figure 2:
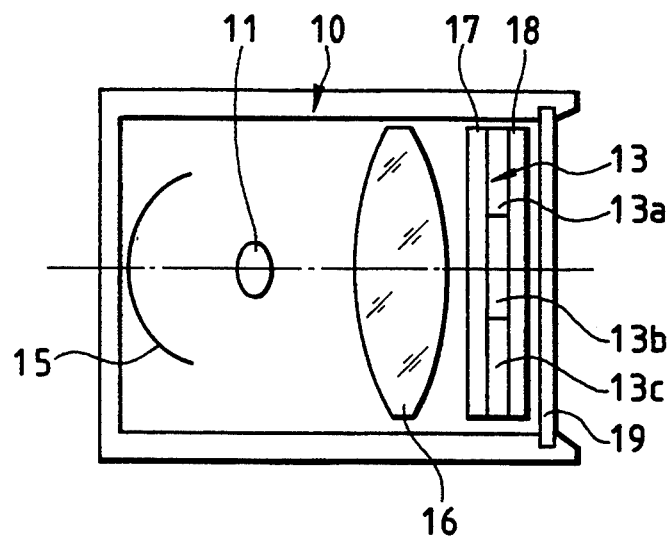
FIG. 2 shows a horizontal cross section viewing the inside of a flashlight.

FIG. 2 is a detail diagram showing a horizontal cross section viewing the inside of the mechanism of a flashlight 10. The flashlight 10 includes a flash tube 11, a reflector 15, a light distribution lens 16, a weighting control element 13, deflecting plates 17 and 18 arranged back and forth of the weighting control element 13, and a protective glass plate 19.

Figure 3:
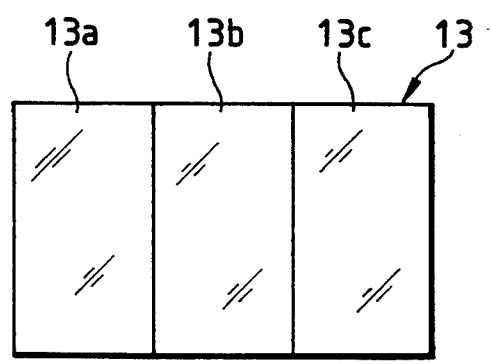
FIG. 3 is a front view of a weighting control element.
Figure 4:
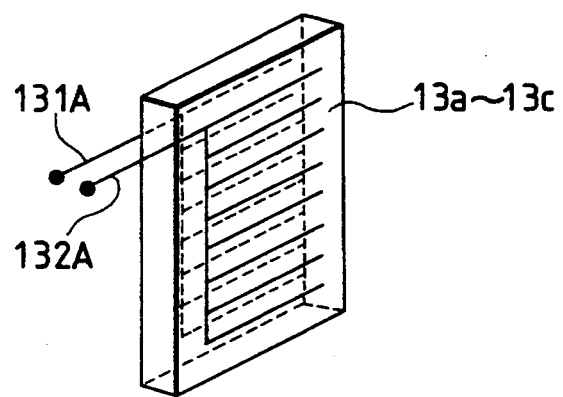
FIG. 4 is a perspective view of a transparent ceramic plate forming the weighting control element.
Figure 5:
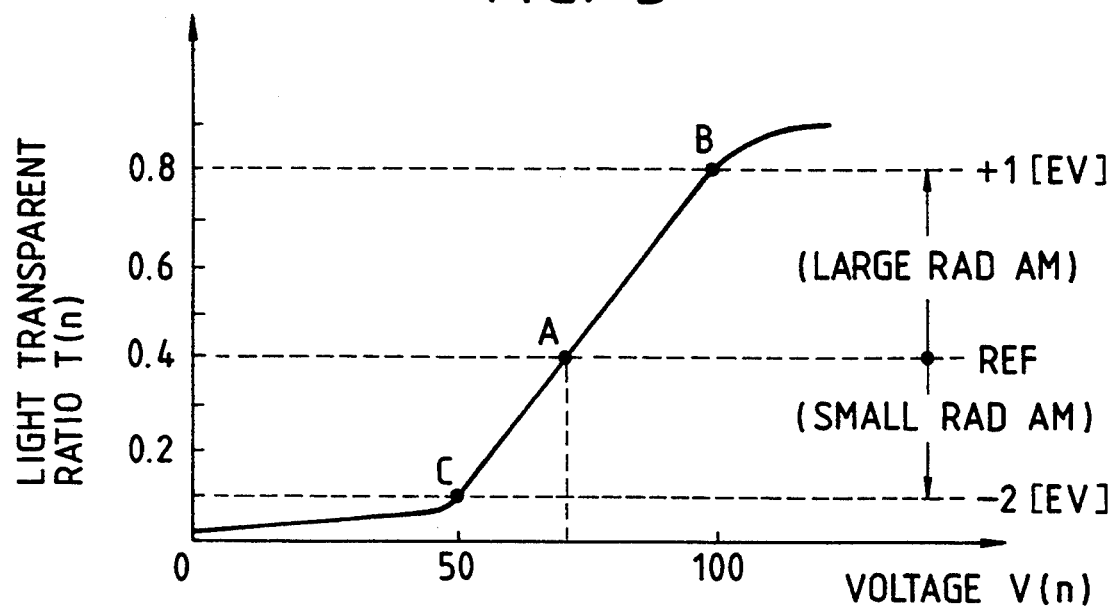
FIG. 5 is a characteristic chart of the light transmittance of transparent ceramic vs. the applied voltage.

The weighting control element 13 is made of transparent ceramic (PLZT) or liquid crystal. In this embodiment, three transparent ceramic plates 13a to 13c are, as shown in FIG. 3, set in array horizontally. Each of the transparent ceramic plates 13a to 13c has mutually-opposing transparent electrodes 131A and 132A as shown in FIG. 4. The light transmittance can be controlled as shown in FIG. 5 by changing the voltage applied between mutually-opposing electrodes 131A and 132A. Therefore, assuming that a field is divided into three domains of left, center, and right domains, if the light transmittances for the domains are independently controllable, radiation light coming from the flash tube 11 can be weighted differently among the domains. Thus, light distribution in the field is controllable. Herein, the characteristic of the graph of FIG. 5 is calculated according to the expression below.

$$T(n) = 0.4 \times 2^{\Delta EV(n)}$$

In FIG. 1, a camera 30 includes a divided photometry element 31 for exposure control, a photoelectric transfer element 32 for focus detection, and a divided photometry element 33 for light adjustment. The divided photometry element for exposure control 31 meters incident luminous flux (mainly, stationary light) passing through a photographic lens in five divided domains 31a to 32e. A photometry circuit 34 compresses the metered outputs logarithmically, and converts the compressed outputs into luminance values. The photoelectric transfer element for focus detection 32 detects foci in three focus detection domains 32a to 32c. Each of the focus detection domains is provided with a pair of image sensor array. A focus detection circuit 35 processes focus detection signals sent from pairs of images sensors in the focus detection domains, and calculates the focus adjustment levels in the focus detection domains according to a well-known method. The light adjustment photometry element 33 meters incident luminous flux passing through the photographic lens (mainly, light of a flash reflected from subjects) in domains 33a to 33c that correspond to the focus detection domains 32a to 32c. A light adjustment circuit 36 amplifies the photometric signals sent from the domains of the light adjustment photometry element 33, and integrates the amplified signals at regular intervals.

The output signals of the circuits 34 to 36 are put in a CPU 37. The CPU 37 is a one-chip microcomputer having a ROM, a RAM, and other peripheral circuits. The CPU 37 controls amounts of light of a flash tube 11 according to a procedure to be mentioned later, and also controls weighting control elements 13a to 13c for optimal light distribution.

Next, a control procedure of a CPU 37 will be described in conjunction with the flowcharts of FIGS. 6 to 10.

Figure 6:
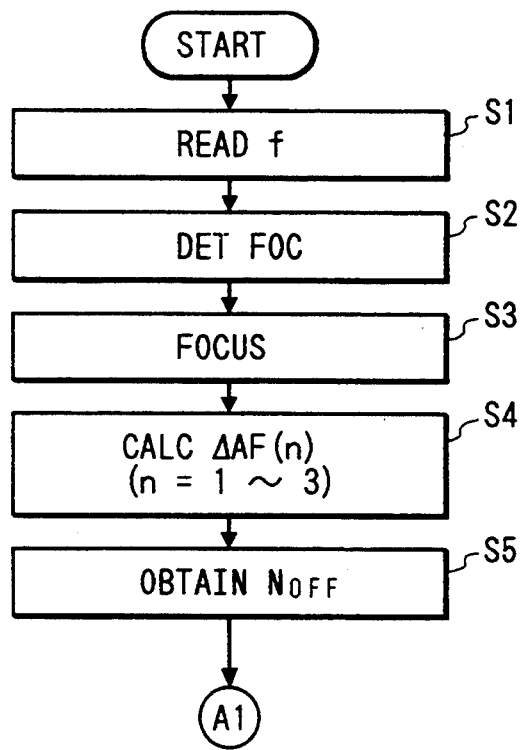
FIG. 6 is a flowchart showing the procedure of controlling light distribution according to the arrangement of subjects.
Figure 7:
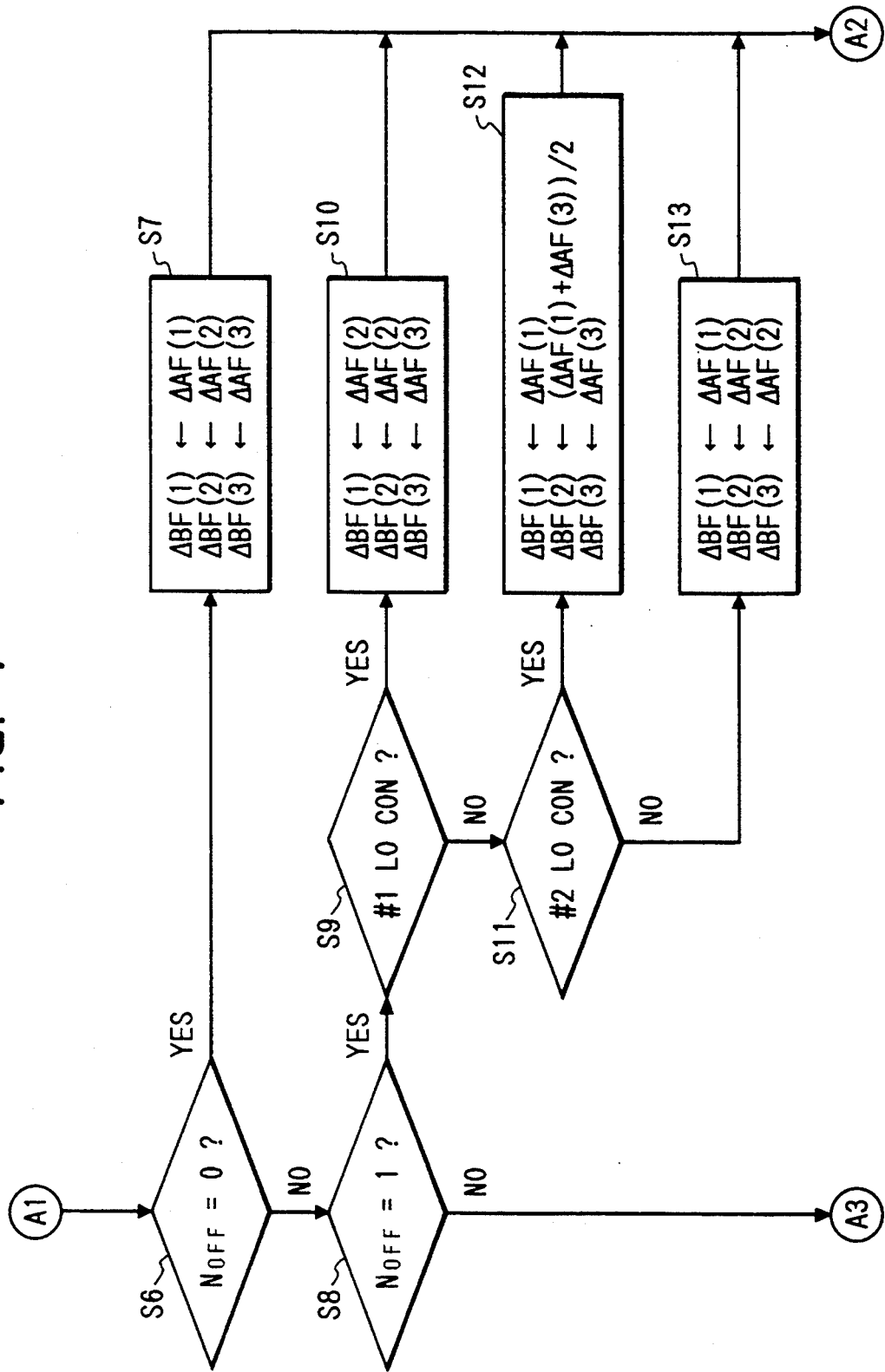
FIG. 7 is a flowchart showing the procedure succeeding that of FIG. 6.

First, a focal length f of a photographic lens is read at a step S1 in FIG. 6. This is accomplished by reading information already existent in a lens ROM in the photographic lens. At a step S2, a focus detection signal is fetched from a focus detection circuit 35. At a step S3, the photographic lens is focused according to the focus detection signal.

At a step S4, quantities of focal aberration $\Delta AF(1)$, $\Delta AF(2)$, and $\Delta AF(3)$ in three focus detection domains 32a to 32c are calculated. Herein, if $\Delta AF(n)$ (n=1 to 3)=0, the subject in the area is in focus. If $\Delta AF(n)>0$, the subject in the area resides beyond the focusing distance. If $\Delta AF(n)<0$, the subject in the area resides inward of the focusing distance.

Next, at a step S5, the number of domains in which quantities of focal aberration cannot be calculated because of the low-contrast subjects are specified as $N_{OFF}$. If it is determined at a step S6 of FIG. 7 that $N_{OFF}=0$, control passes to a step S7. Then, $\Delta AF(1)$, $\Delta AF(2)$, and $\Delta AF(3)$ are set as follows:

$$\Delta BF(1) = \Delta AF(1)$$

$$\Delta BF(2) = \Delta AF(2)$$

$$\Delta BF(3) = \Delta AF(3)$$

Figure 9:
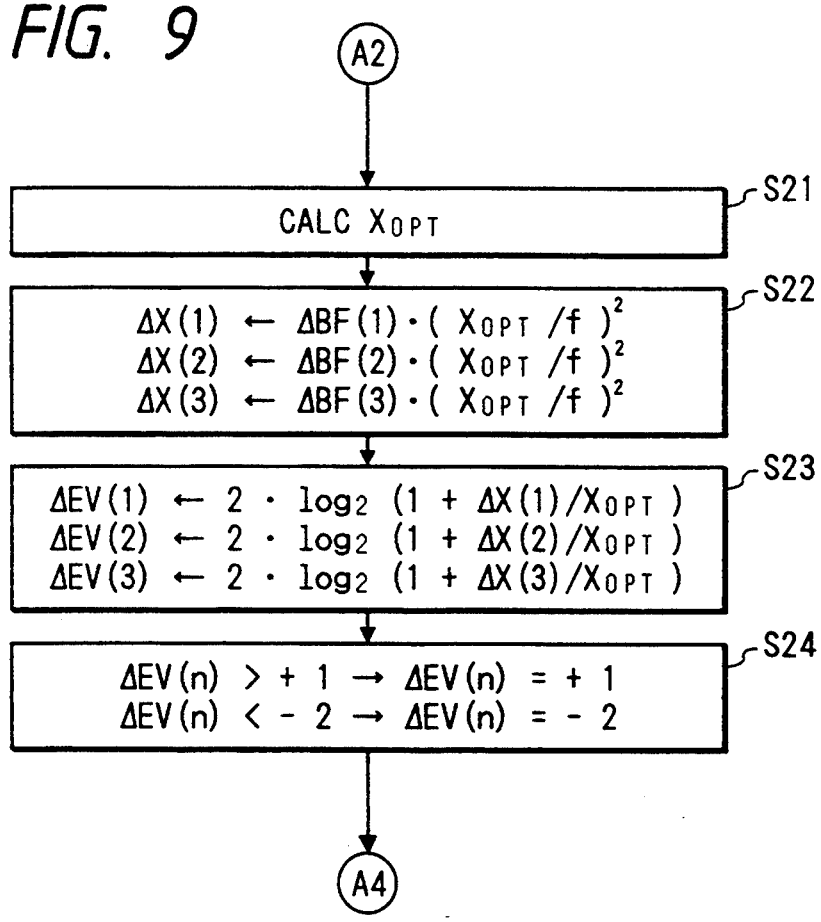
FIG. 9 is a flowchart showing the procedure succeeding those of FIGS. 7 and 8.

Then, control advances to a step S21 of FIG. 9. If it is determined at the step S6 that $N_{OFF}$ is not 0, control passes to a step S8. If it is determined at the step S8 that $N_{OFF}=1$, control passes to a step S9.

At steps S9 and S11, the low-contrast domain in which a quantity of focal aberration cannot be calculated is identified. Then, if it is determined at the step S9 that the low-contrast domain is a domain 1 (domain 32a), control passes to a step S10. Since $\Delta AF(1)$ of the domain 1 has not been calculated, the $\Delta AF(2)$ value of an adjoining domain 2 (domain 32b) is set in $\Delta BF(1)$.

$$\Delta BF(1) = \Delta AF(2)$$

Herein, $\Delta AF(2)$ and $\Delta AF(3)$ of the domains 2 and 3 are set as they are.

$$\Delta BF(2) = \Delta AF(2)$$

$$\Delta BF(3) = \Delta AF(3)$$

If it is determined at a step S11 that the domain 2 is a low-contrast domain, control passes to a step S12. Since $\Delta AF(2)$ of the domain 2 has not been calculated, the $\Delta AF(1)$ and $\Delta AF(3)$ values of the adjoining domains 1 and 3 are used to specify $\Delta BF(2)$.

$$\Delta BF(2) = (\Delta AF(1) + \Delta AF(3))/2$$

$\Delta AF(1)$ and $\Delta AF(3)$ of the domains 1 and 3 are set as they are.

$$\Delta BF(1) = \Delta AF(1)$$

$$\Delta BF(3) = \Delta AF(3)$$

Then, control passes to a step S21 of FIG. 9.

If it is determined at the step S11 that the domain 2 is not a low-contrast domain, control passes to a step S13. Since $\Delta AF(3)$ of the domain 3 has not been calculated, the $\Delta AF(2)$ value of the adjoining domain 2 is set in $\Delta BF(3)$.

$$\Delta BF(3) = \Delta AF(2)$$

$\Delta AF(1)$ and $\Delta AF(2)$ of the domains 1 and 2 are set as they are.

$$\Delta BF(1) = \Delta AF(1)$$

$$\Delta BF(2) = \Delta AF(2)$$

Then, control passes to a step S21 of FIG. 9.

Figure 8:
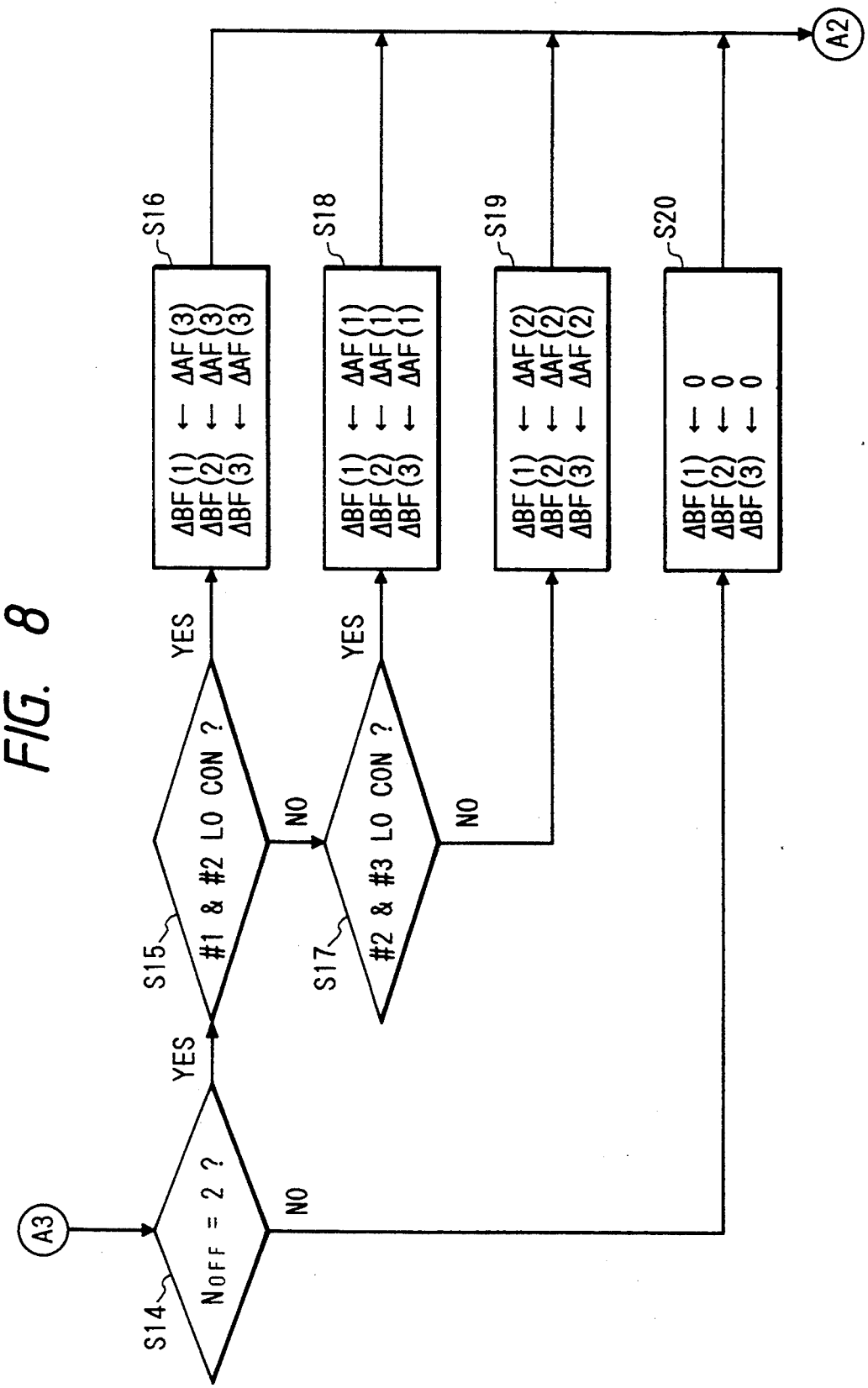
FIG. 8 is a flowchart showing the procedure succeeding that of FIG. 7.

On the other hand, if it is determined at a step S8 that $N_{OFF}$ is not 0, control passes to a step S14 of FIG. 8. Then, if it is determined whether $N_{OFF}$ is 2. If 2, control advances to a step S15. If it is determined at the step S15 that the domains 1 and 2 are low-contrast domains, control passes to a step S16. Since $\Delta AF(1)$ and $\Delta AF(2)$ of the domains 1 and 2 have not been calculated, the $\Delta AF(3)$ value of the remaining domain 3 is set in $\Delta BF(1)$ and $\Delta BF(2)$.

$$\Delta BF(1) = \Delta AF(3)$$

$$\Delta BF(2) = \Delta AF(3)$$

$\Delta AF(3)$ of the domain 3 is set as it is.

$$\Delta BF(3) = \Delta AF(3)$$

Then, control passes to a step S21 of FIG. 9.

If it is determined at a step S17 that the domains 2 and 3 are low-contrast domains, control passes to a step S18. Since $\Delta AF(2)$ and $\Delta AF(3)$ of the domains 2 and 3 have not been calculated, the $\Delta AF(1)$ value of the remaining domain 1 (domain 13a) is set in $\Delta BF(2)$ and $\Delta BF(3)$.

$$\Delta BF(2) = \Delta \Delta AF(1)$$

$$\Delta BF(3) = \Delta \Delta AF(1)$$

$\Delta AF(1)$ of the domain 1 is set as it is.

$$\Delta BF(1) = \Delta AF(1)$$

Then, control passes to a step S21 of FIG. 9.

If it is determined at the step S17 that the domains 2 and 3 are not low-contrast domains, control passes to a step S19. Since $\Delta AF(1)$ and $\Delta AF(3)$ of the domains 1 and 3 have not be encalculated, the $\Delta AF(2)$ value of the remaining domain 2 is set in $\Delta BF(1)$ and $\Delta BF(3)$.

$$\Delta BF(1) = \Delta AF(2)$$

$$\Delta BF(3) = \Delta AF(2)$$

$\Delta AF(2)$ of the domain 2 is set as it is.

$$\Delta BF(2) = \Delta AF(2)$$

Then, control passes to a step S21 of FIG. 9.

If it is determined at a step S14 that $N_{OFF}$ is not 2, control passes to a step S20. Since the three domains are low-contrast domains, 0s are specified as their quantities of focal aberration.

$$\Delta BF(1) = 0$$

$$\Delta BF(2) = 0$$

$$\Delta BF(3) = 0$$

Then, control passes to the step S21 of FIG. 9.

At the step S21 of FIG. 9, the position of a photographic lens that is in focus is detected using a lens encoder, then a photographic distance $X_{OPT}$ is calculated using the quantities of focal aberration and the lens position. Then, control passes to a step S22. Quantities of photographic distance aberration in three distance measuring domains are calculated according to the expressions below.

$$\Delta X(1) = \Delta BF(1) \cdot (X_{OPT}/f)^2$$

$$\Delta X(2) = \Delta BF(2) \cdot (X_{OPT}/f)$$

$$\Delta X(3) = \Delta BF(3) \cdot (X_{OPT}/f)$$

Herein, if $\Delta X(n) = 0$, the photographic distance equals to $X_{OPT}$. If $\Delta X(n) > 0$, the photographic distance is larger than $X_{OPT}$. If $\Delta X(n) < 0$, the photographic distance is smaller than $X_{OPT}$.

Then, control passes to a step S23. Quantities of radiation correction are calculated according to the expressions below. The quantity of radiation correction corresponds to a quantity of weighting radiation light for each domain, and represents a ratio of a quantity of radiation for a domain to that for other domain.

$$\Delta EV(1) = 2 \cdot \log_2(1 + \Delta X(1)/X_{OPT})$$

$$\Delta EV(2) = 2 \cdot \log_2(1 + \Delta X(2)/X_{OPT})$$

$$\Delta EV(3) = 2 \cdot \log_2(1 + \Delta X(3)/X_{OPT})$$

Herein, if $\Delta EV(n) = 0$, a quantity of radiation is set to a standard quantity of radiation. If $\Delta EV(n) > 0$, a quantity of radiation is set to be larger than the standard quantity of radiation. If $\Delta EV(n) < 0$, a quantity of radiation is set to be smaller than the standard quantity of radiation.

A very large quantity of correction may result in irregular light distribution. At a step S24, quantities of correction are limited. Specifically, if $\Delta EV(n)$ is larger than $+1$, $\Delta EV(n) = +1$ is specified. If $\Delta EV(n)$ is smaller than $-2$, $\Delta EV(n) = -2$ is specified. The absolute values for limitation differ between signs. This intends to prevent the closest values from causing overexposure.

Figure 10:
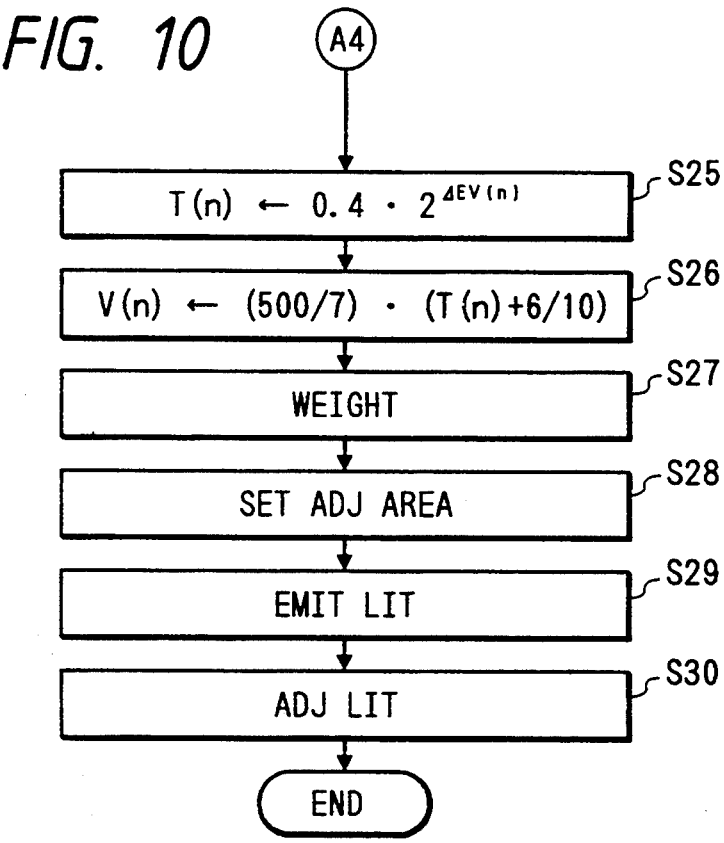
FIG. 10 is a flowchart showing the procedure succeeding that of FIG. 9.

Next, at a step S25 of FIG. 10, light transmittances or rates at which the domains of a radiation light weighting control element 13 should transmit light are calculated using the $\Delta EV(n)$ values according to the characteristic function of FIG. 5 or the expression below.

$$T(n) = 0.4 \times 2^{\Delta EV(n)}$$

At a step S26, weighting voltages $V(n)$ that a weighting control circuit 14 should apply to the radiation light weighting control element 13 are calculated as follows:

$$V(n) = (500/7) \times (T(n) + 6/10)$$

Thus, the applied voltages $V(n)$ are calculated in terms of the aforesaid quantities of radiation correction $\Delta EV(n)$.

At a step S27, the calculated weighting voltages $V(n)$ are supplied to the radiation light weighting control element 13 via a weighting control circuit 14. At a step S28, a domain having a minimum $\Delta BF(n)$ value is specified as a light adjustment domain or a domain that is subjected to light adjustment. If multiple domains have the minimum value, all of them are specified. At a step S29, the flash tube 11 of the flashlight 10 is started to emit light. The radiation light is radiated to subjects via the weighting control element 13. At this time, if the calculated $\Delta EV(n)$ is 0, a quantity of light radiated to subjects is equivalent to a standard quantity of radiation.

If ΔEV(n) exceeds 0, the quantity of radiation is larger than the standard quantity. If ΔEV(n) is less than 0, the quantity of radiation is smaller than the standard quantity.

At a step S30, when a quantity of light metered in the light adjustment domain determined at the step S28 (value detected by the light adjustment photometry element 33 and supplied via the light adjustment circuit 36) reaches a predetermined value, the flash tube 11 is stopped to emit light.

In a camera having the aforesaid flashlight, as shown in FIGS. 11 to 13B, light distribution is controlled according to spatial distribution of subjects. Near and far subjects alike are radiated with almost the same amount of light.

Figure 11:
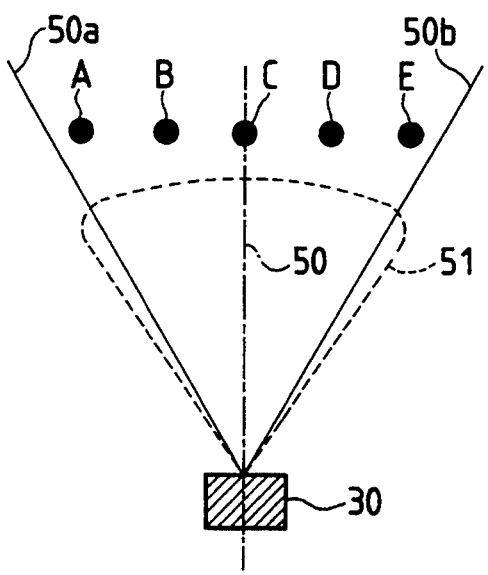
FIG. 11 is an explanatory diagram for explaining spatial distribution of subjects, and the control of light distribution.
Figure 12A:
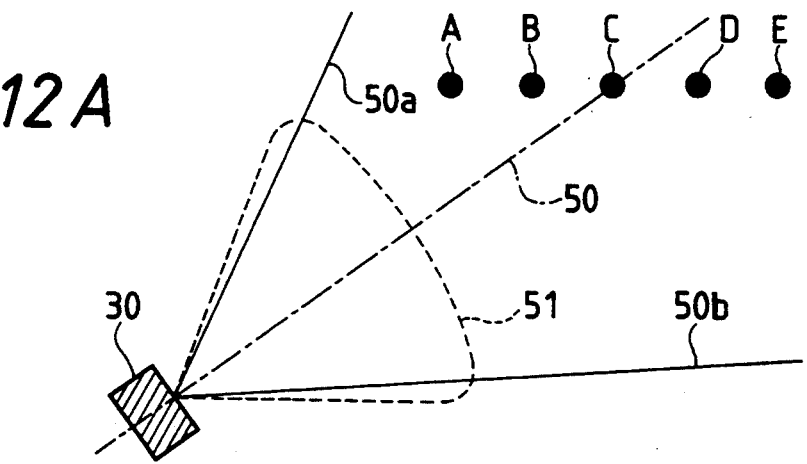
FIGS. 12A and 12B are explanatory diagrams for explaining spatial distribution of subjects, and the control of light distribution.
Figure 12B:
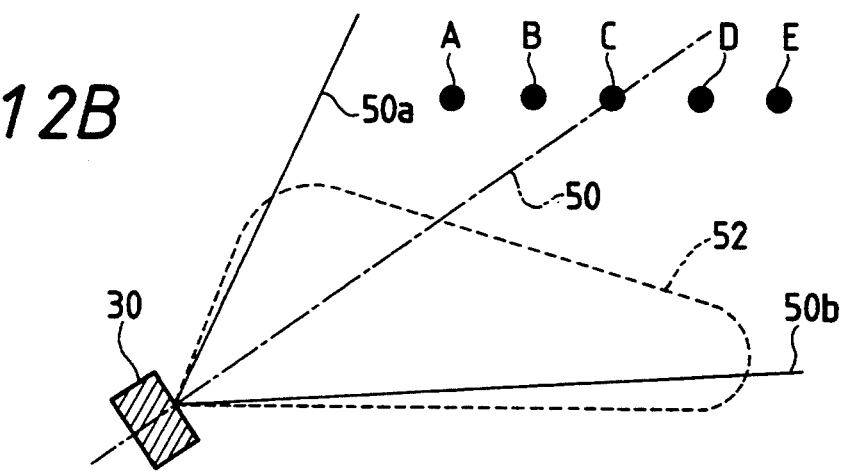

In FIG. 11, multiple subjects A to E are arranged at almost the same distances from a focal point. In this case, transparent ceramic plates 13a to 13c making up a weighting control element 13 are controlled to have almost an equal light transmittance. This results in light distribution symmetric with respect to an optical axis 50 of a camera as indicated with a dotted line 51. When multiple subjects A to E lie gradually farther as shown in FIG. 12A, the light distribution indicated with the dotted line 51 in FIG. 12A (the light transmittances of the transparent ceramic plates 13a to 13c are almost equal) causes farther subjects to suffer greater insufficiencies in amount of light. An under-exposure photograph ensues. Therefore, the light transmittances of the transparent ceramic plates 13a to 13c are controlled to provide light distribution asymmetric with respect to the optical axis of the camera as indicated with a dotted line 52 in FIG. 12B. Then, the amounts of radiation light are weighted to become almost uniform among the subjects.

Figure 13A:
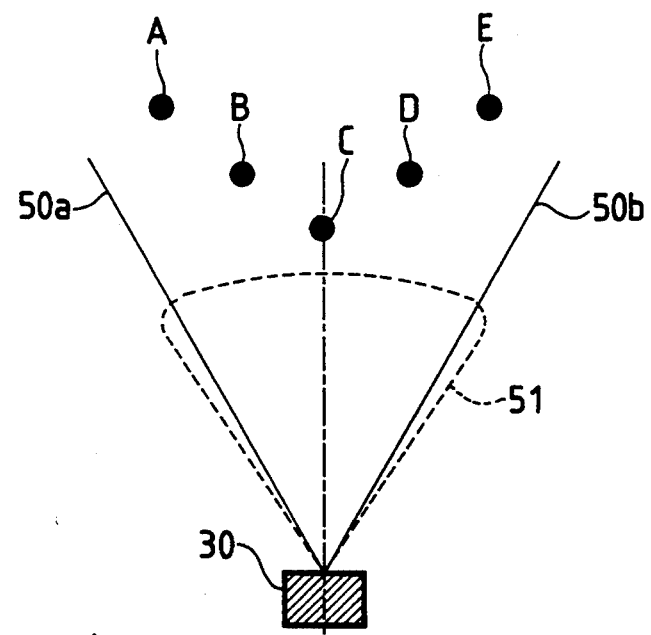
FIGS. 13A and 13B are explanatory diagrams for explaining spatial distribution of subjects, and the control of light distribution.
Figure 13B:
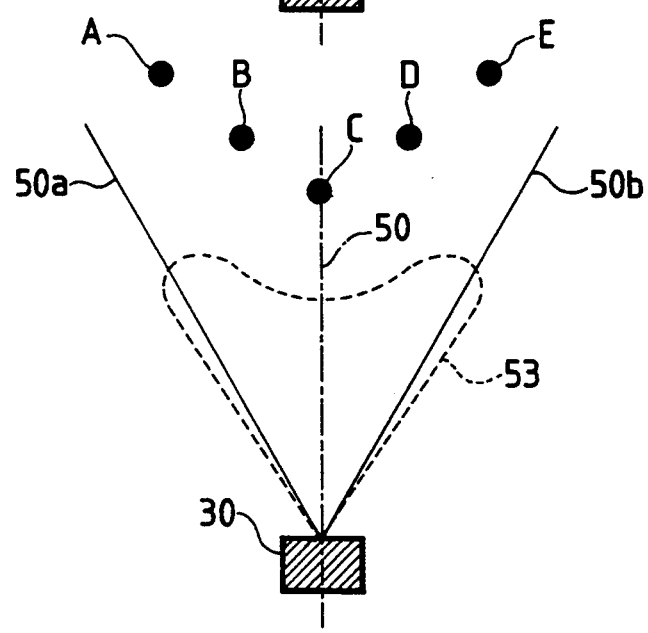

When, as shown in FIG. 13A, a center subject lies closest to a focal point and other subjects on the right and left of the center subject reside gradually farther, if light distribution is controlled to be uniformly as indicated with a dotted line 51 in FIG. 13A, farther subjects suffer insufficient amounts of light more severely. This results in an under-exposure photograph. Then, the light transmittances of the transparent ceramic plates 13a to 13c are controlled to provide light distribution indicated with a dotted line 53 in FIG. 13B. This allows all the subjects to receive an almost uniform amount of radiation light.

In FIGS. 11 to 13B, symbols 50a and 50b denote radiation ranges symmetric with respect to an optical axis 50 of a camera.

In this embodiment, unlike examples of prior art, a single flash tube is used, light the flash tube emits is weighted differently among three domains so that the amount of light can be controlled in domains, then the light is emitted to subjects. This realizes a compact and lightweight design, reduces required energy, and eventually minimizes heat dissipation during continuous operation. Furthermore, overlapping or missing radiation does not occur on borders of divided domains. This prevents irregular light distribution. Moreover, since only one light adjustment circuit is required, simple circuitry is realized.

In the aforesaid configuration of the embodiment, a flash tube 11 serves as a light emission port. A photoelectric transfer element 32 and a focus detection circuit 35 serves as distance measuring means. A CPU 37 acts as a calculation and control means. A weighting control element 13 and a weighting control circuit 15 act as weighting means.

Distance measurement implemented in this embodiment is based on a TTL positional difference detection method. As far as photographic distance information is available, distance measurement may be done according to an external metering system or an active distance measuring system. An automatic TTL light adjustment method is adopted in the aforesaid embodiment, an external metering or flashmatic system may be employed.

When amounts of radiation light for domains are adjusted, a domain that is in focus is recognized as a reference domain. Using the amount of radiation light for the reference domain as a reference, amounts of radiation light for other domains are determined. The reference domain may not necessarily be a domain that is in focus, but may be a domain of a nearest subject or a farthest subject. When a domain in focus is regarded as a reference domain, the light transmittance of a transparent ceramic plate belonging to the domain is set to about 50%. Then, the light transmittances of domains containing nearer subjects are set to less than 50%, and those of domains containing farther subjects, to more than 50%. When a domain containing a nearest subject or a domain containing a farthest subject is regarded as a reference domain, the light transmittance of a transparent ceramic plate for the nearest subject domain is reduced, while that for the farthest subject domain is increased. Then, the light transmittance of a transparent ceramic plate for the domain in focus is set to an intermediate value.

Figure 14:
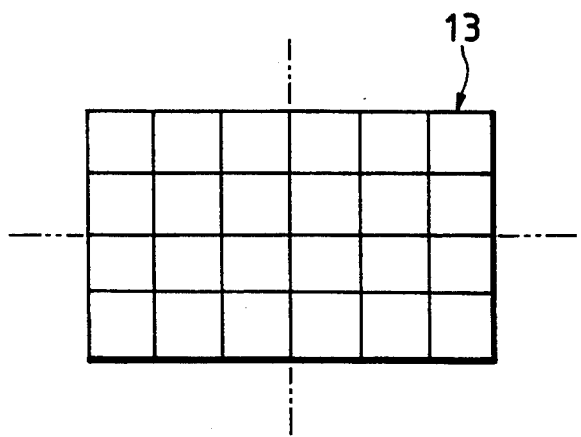
FIG. 14 is a front view showing another embodiment of a weighting control element.

In the aforesaid embodiment, a focus detection domain is divided into three portions, and a light adjustment domain is divided into three portions accordingly. The focus detection domain may be divided more finely, and a weighing control element 13 may also be divided more finely as shown in FIG. 14 so that a field can be controlled according to a finely-divided control map.

According to the present invention, in a divided radiation type flashlight system, a single light emission port is used, and the light the light emission port emits is weighted differently among multiple domains so that the amount of light will be controlled in domains. Then, the light is emitted to subjects. This provides the following advantages:

(1) a whole flashlight is designed to be compact and lightweight, (2) required energy is limited, and heat dissipation during continuous operation is minimized, (3) overlapping or missing radiation does not occur on borders of divided domains, unlike a conventional flashlight, thus preventing irregular light distribution, and (4) only one light adjustment circuit is required, thus realizing simple control circuitry. If the amounts of light for projection domains are controlled according to the spatial distribution of subjects, far and near subjects alike can be illuminated nearly uniformly.

According to the present invention, a camera capable of loading a divided radiation type flashlight provides the same advantages as those mentioned above.

According to the present invention, when a divided radiation type flashlight is loaded on the camera, the same advantages as those mentioned above result.

Figure 15A:
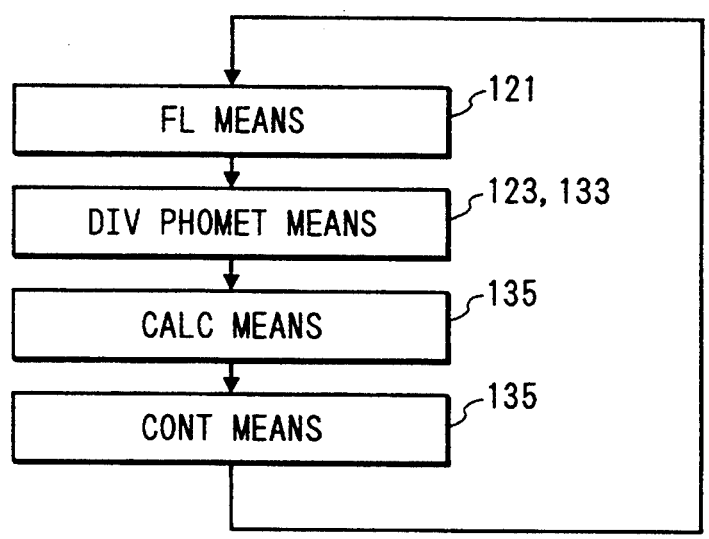
FIGS. 15A and 15B show other embodiments of the present invention.

Other embodiment will be described in conjunction with FIG. 15A. This embodiment comprises a flashing means 21 including a light emission port, and a light amount control port capable of controlling amounts of light originating from multiple projection domains corresponding to multiple radiation domains of a field, and performing pre-emission and main emission, divided photometry means 23 and 33 for metering luminous flux emitted by the flashing means 21 and reflected from a field in multiple domains, a calculating means 35 for calculating the quantities of weight for main emission for the multiple projection domains of the flashing means 21 using the results of photometry the divided photometry means 23 and 33 perform during pre-emission of the flashing means 21, and a control means 32 for controlling amounts of projection light for the multiple projection domains of the flashing means 21 according to the quantities of weight the calculating means 35 calculates.

In the embodiment having the foregoing configuration, a pattern of multiple divided photometry domains of a divided photometry means 23 or 33 is almost the same as that of multiple projection domains of a flashing means 21.

Figure 15B:
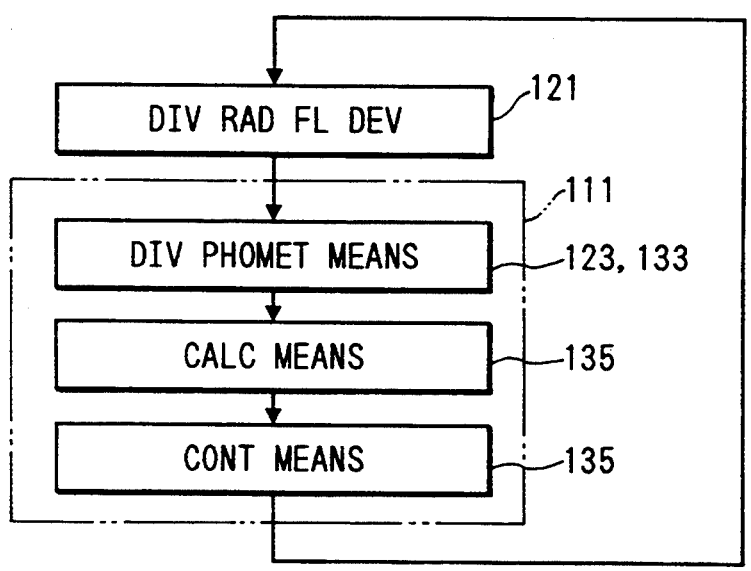

Another embodiment will be described in conjunction with FIG. 15B. This embodiment is a camera capable of loading a divided radiation type flashlight 21 including a light emission port, and a light amount control port arranged forward of the light emission port and capable of controlling amounts of light originating from multiple projection domains corresponding to multiple radiation domains of a field, and performing pre-emission and main emission. The camera further comprises divided photometry means 23 and 33 for metering luminous flux emitted by the divided radiation type flashlight 21 and reflected from a field in multiple domains, a calculating means 35 for calculating the quantities of weight for main emission for the multiple projection domains of the divided radiation type flashlight 21 using the results of photometry the divided photometry means 23 and 33 perform during pre-emission of the divided radiation type flashlight 21, and a control means 35 for controlling the amounts of projection light for the multiple projection domains of the divided radiation type flashlight 21 according to the quantities of weight the calculating means 35 calculates.

In the embodiment having the foregoing configuration, a pattern of multiple divided photometry domains of a divided photometry means 23 or 33 is almost the same as that of multiple emission domains in a divided radiation type flashlight 21.

Another embodiment provides a divided radiation type flashlight including a light emission port, and a light amount control port arranged forward of the light emission port and capable of controlling the amounts of light originating from multiple projection domains corresponding to multiple radiation domains of a field, and performing pre-emission and main emission. The light amount control port of the divided radiation type flashlight inputs the quantities of weight for multiple projection domains calculated using the results of photometry performed in the multiple domains, and controls the amounts of light for the multiple projection domains for main emission according to the quantities of weight.

In the embodiment having the foregoing configuration, a division pattern for metering multiple domains during pre-emission is almost the same as that of multiple projection domains of a divided radiation type flashlight.

In this embodiment, a calculating means 35 calculates the quantities of weight for main emission for the multiple projection domains of a flashing means 21 using the metered values of divided domains metered by divided photometry means 23 and 33 during pre-emission. A control means 35 controls the amounts of projection light for the multiple projection domains in the flashing means 21 according to the quantities of weight.

A calculating means 35 calculates the quantities of weight for main emission for the multiple projection domains of a divided radiation type flashlight 21 using the results of photometry divided photometry means 23 and 33 perform during pre-emission of the divided radiation type flashlight 21. Then, a control means 35 controls the amounts of projection light in the multiple projection domains in the divided radiation type flashlight 21 according to the quantities of weight.

A light amount control port of a divided radiation type flashlight inputs the quantities of weight for multiple projection domains calculated using the results of photometry performed in multiple domains, and controls the amounts of light for the multiple projection domains for main emission according to the quantities of weight.

Figure 16:
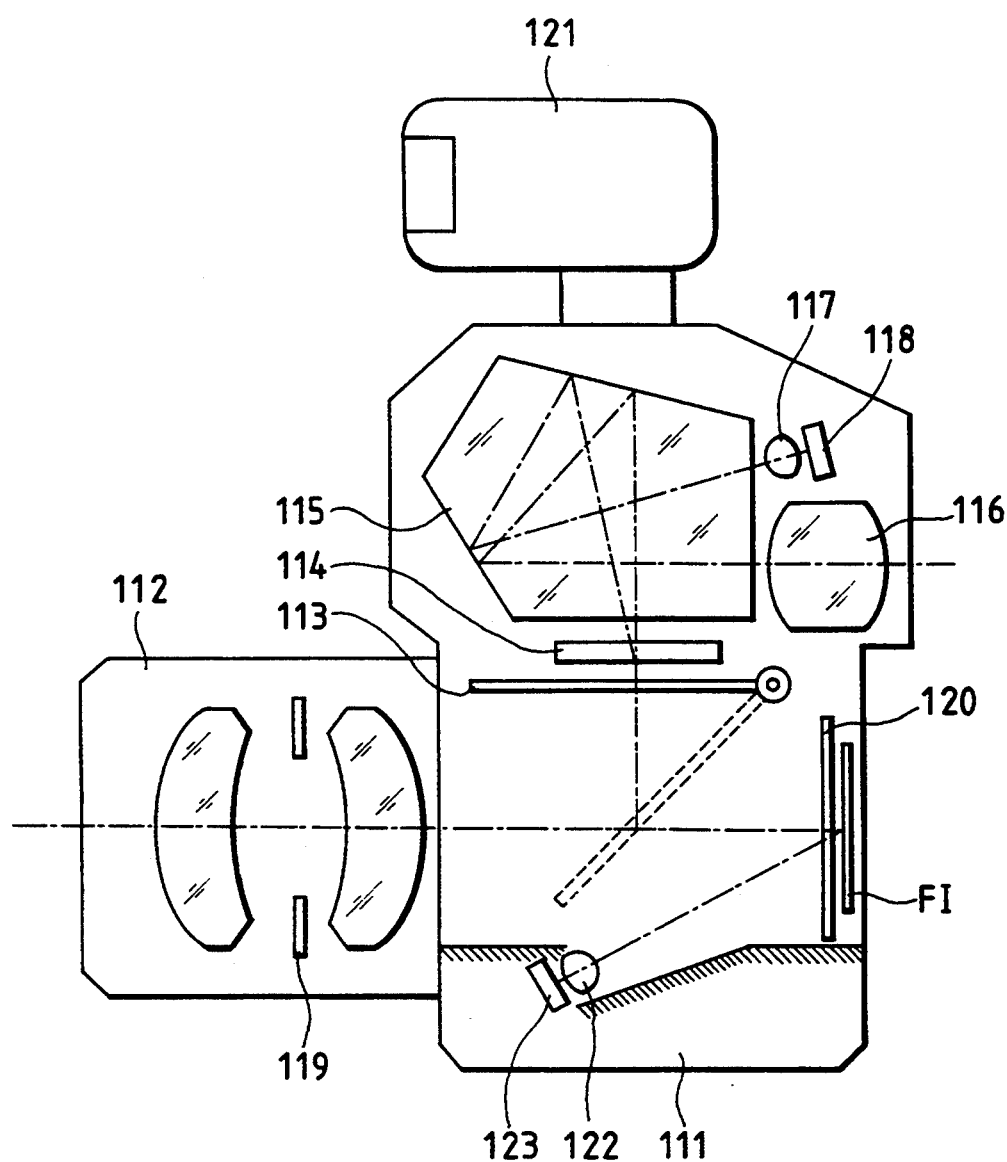
FIG. 16 shows a configuration of an automatic TTL light adjustment camera according to the present invention.

FIG. 16 shows a configuration of an automatic TTL light adjustment camera 111 of an embodiment.

When a finder is looked into, luminous flux (stationary light) passing through a photographic lens 112 is reflected from a mirror 113 that is in a down state indicated with a dashed line, then passes through a screen 114 and a pentaprism 115. Part of the reflected light enters an eyepiece 116. Other part of the reflected light goes to an exposure control photometry element 118. During photography, when a shutter release button, which is not shown, is released, the mirror 113 is driven to assume an Up state indicated with a solid line. An aperture 119 is narrowed, and a shutter 120 is opened and closed. Thereby, subject light passing through the photographic lens 112 is guided to film FI to expose the film FI.

During flashing, after the shutter 120 opens, a flashlight 121 performs main emission to illuminate subjects. Light reflected from the subjects passes through the photographic lens 112 and reaches the film surface. Luminous flux reflected from the film surface passes through a condenser lens array 122 and reaches a light adjustment light receiving element 123. In a camera according to this embodiment, pre-emission can be done to check the state of a field prior to main emission. Light reflected from the field after the pre-emission is reflected from the curtain of the closed shutter 120, and received by the light receiving element 123.

Figure 17:
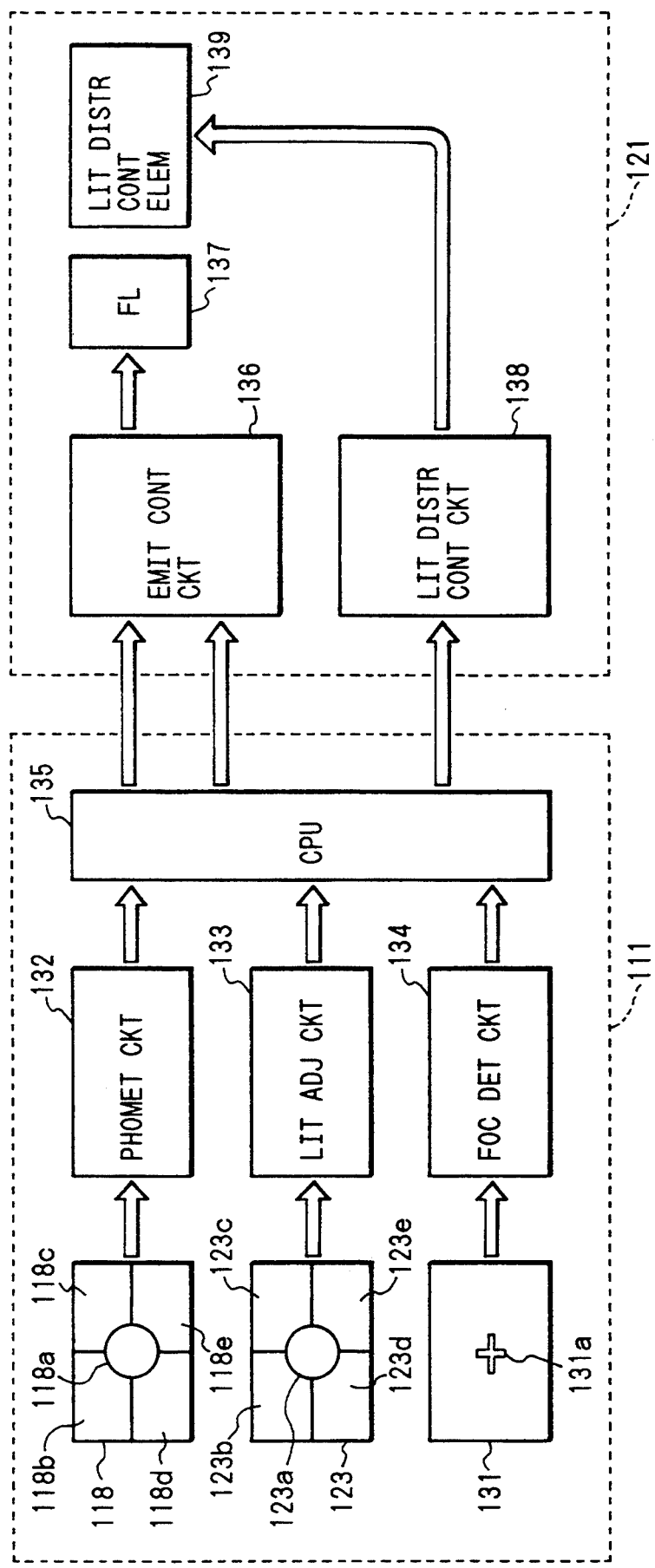
FIG. 17 is a control block diagram of a camera having a flashlight of the present invention.

FIG. 17 is a control block diagram of a camera having a flashlight of an embodiment.

In FIG. 17, 111 denotes a camera capable of loading or connecting a divided radiation type flashlight 121. An exposure control photometry element 118 meters luminous flux passing through a photographic lens 112 (mainly, stationary light) separately in five domains 118a to 118e. A light adjustment light receiving element 123 receives the luminous flux passing through the photographic lens 112 (mainly, flash) separately in five domains 123a to 123e. 131 denotes an image sensor or other focus detecting element. The focus detecting element 131 uses the luminous flux passing through the photographic lens 112 to detect state values of focal adjustment in the photographic lens 112 in the domain 131a.

132 denotes a photometry circuit, which compresses output signals of the exposure control photometry element 118 logarithmically, and converts the compressed signals into luminance values. 133 is a light adjustment circuit for amplifying output signals of the light adjustment light receiving element 123, and integrating the amplified signals at regular intervals. 134 is a focus detecting circuit, which calculates quantities of focal aberration and aberrant directions of the photographic lens 112 using the output signals of the focus detecting element 131. 135 denotes a CPU for calculating exposure values using the luminance values sent from the photometry circuit 132, allows the flashlight 121 to stop flashing according to the output signal of the light adjustment circuit 133, and drives the photographic lens 112 according to the quantities of aberration and aberrant directions sent from the focus detecting circuit 134.

136 denotes a light emission control circuit, which controls drive of a flash tube 137 in response to an emission start or stop instruction signal sent from the CPU 135. 138 is a light distribution control circuit to be described later. The light distribution control circuit 138 is arranged forward of the flashlight 137, and controls drive of a light distribution control element 139 for adjusting luminous flux the flash tube 137 emits for projection domains corresponding to radiation domains of a field.

Figure 18:
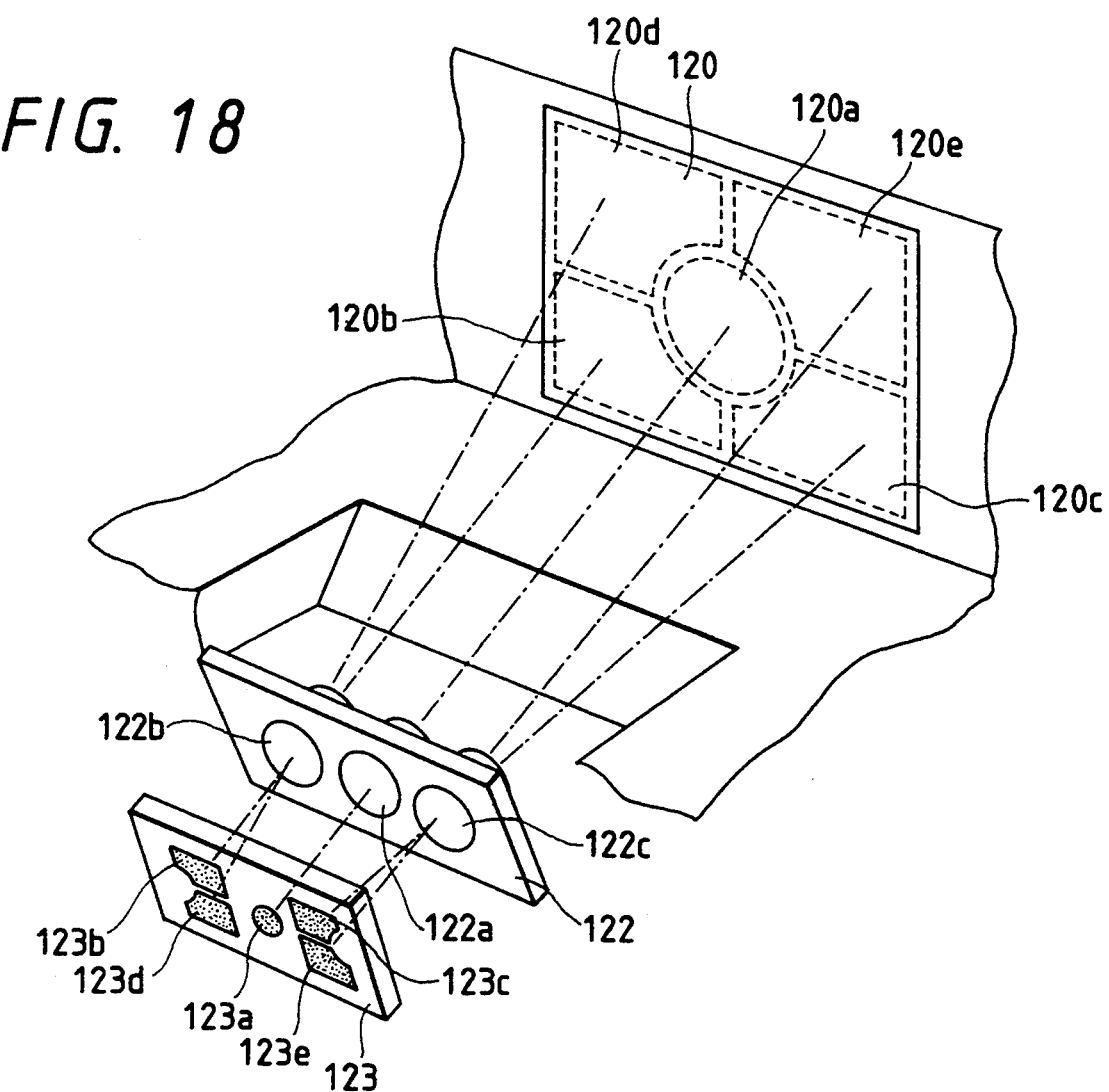
FIG. 18 shows a light adjustment light receiving element for receiving luminous flux emitted by a flashlight and reflected from a field, and the peripheral components.

FIG. 18 details light adjustment light receiving elements 123 for receiving luminous flux emitted by a flashlight 121 and reflected from a field, and the peripheral devices.

A light adjustment light receiving element 123a corresponding to a circular photometry domain in the center of a field, and light adjustment light receiving elements 123b to 123e corresponding to photometry domains lying in both sides of the field and having a rectangular shape with an arc notch are arranged on the same plane. That is to say, in this embodiment, the field is divided into five photometry domains for divided photometry. A condenser lens array 122 is an optical member including three lenses in one-to-one correspondence with left, center, and right blocks of the light receiving elements 123a to 123e.

As shown in FIG. 18, a field projected onto the curtain of a shutter 120 is divided into five portions of a center circular domain 120a and peripheral four domains 120b to 120e. The left, center, and right blocks of the light receiving elements 123a to 123d are, as indicated with dashed lines, opposing the left, center, and right lenses of the condenser lens array 122. The light receiving elements are associated with the domains of a field projected onto the curtain of the shutter 120. The brightnesses in five domains 120a to 120e are metered in domains having substantially the same shapes as the light receiving elements 123.

Figure 19:
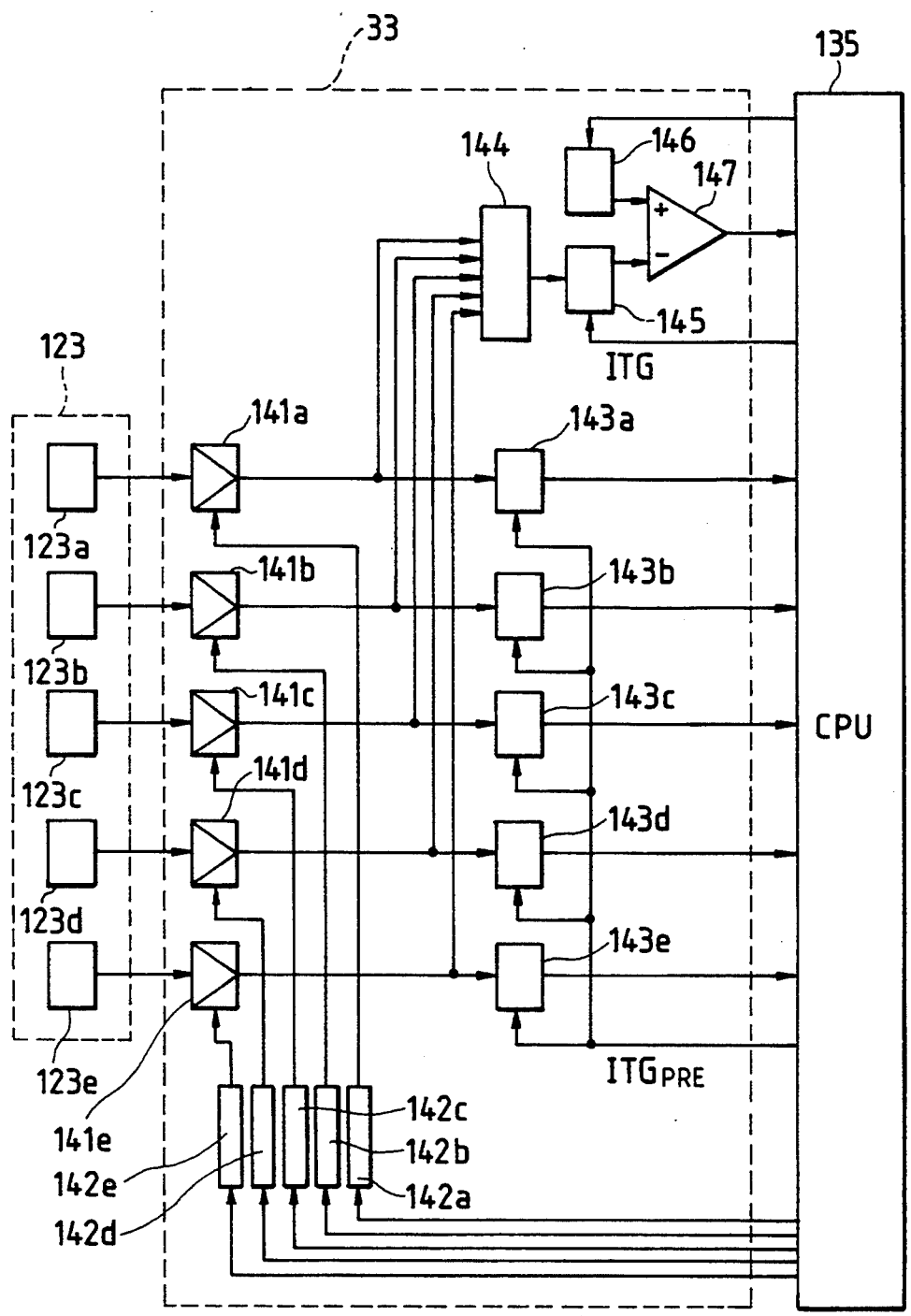
FIG. 19 is a circuit diagram showing a light adjustment circuit in detail.

FIG. 19 is a circuit diagram showing a light adjustment circuit 133 in detail.

The light adjustment circuit 133 includes amplifiers 141a to 141e for amplifying outputs of light adjustment light receiving elements 123a to 123e, and gain setters 142a to 142e for setting amplification factors for the amplifiers 141a to 141e in response to instructions issued from a CPU 135. The gain setters 142a to 142e include D/A converters for converting digital signals sent from the CPU 135 into analog signals. The light adjustment circuit 133 further includes integrating circuits 143a to 143e for integrating the outputs of the amplifiers 141a to 141e at regular intervals during pre-emission in response to instructions from the CPU 135, an adding circuit 144 for adding the outputs of the amplifiers 141a to 141e during main emission, an integrating circuit 145 for integrating the results of addition of the adding circuit 144 at regular intervals in response to an instruction from the CPU 135, a converter 146 for converting a light adjustment level or an analog signal already existent in the CPU 135 into a digital signal, and a comparator 147 for comparing the converted light adjustment level with the output of the integrating circuit 145, and outputting an emission stop signal when the output of the integrating circuit 145 reaches the light adjustment level.

Figure 20:
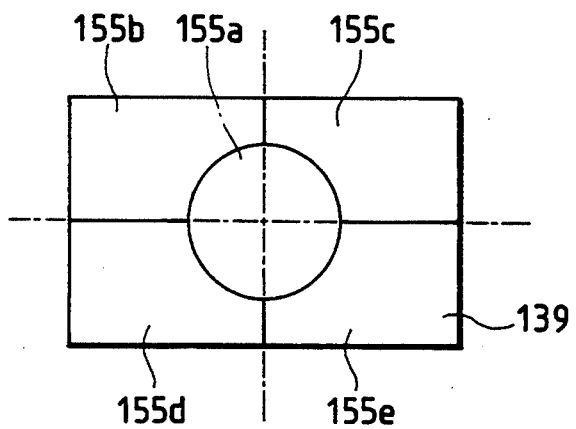
FIG. 20 shows projection domains of a light distribution control element corresponding to radiation domains of a field.

FIG. 20 shows projection domains of a light distribution control element 139 corresponding to radiation domains of a field. A flashlight 121 has the same configuration as that shown in FIG. 2. Another example of projection domains of the light distribution control element 139 is identical to that shown in FIG. 14. The light distribution control element 139 made of transparent ceramic PLZT has the same configuration as that shown in FIG. 4. The operations of the light distribution control element 139 for distributing light over a field will, therefore, be omitted.

The relationship between the weighting voltage V(n) applied between transparent electrodes of the light distribution control element 139 and the light transmittance T(n) of transparent ceramic PLZT is identical to that shown in FIG. 5.

Herein, a projection domain 155a of the light distribution control element 139 corresponding to a center radiation domain of a field is associated with a divided photometry domain 118a in the center of an exposure control photometry element 118 and a divided photometry domain 123a in the center of a light adjustment light receiving element 123. These domains has almost the same shape. Other projection domains 155b, 155c, 155d, and 155e of the light distribution control element 139 corresponding to other four radiation domains of the field are associated with divided photometry domains 118b, 118c, 118d, and 118e of the exposure control photometry element 118, and divided photometry domains 123b, 123c, 123d, and 123e of the light adjustment light receiving element 123. The domains have almost the same shape.

Figure 21:
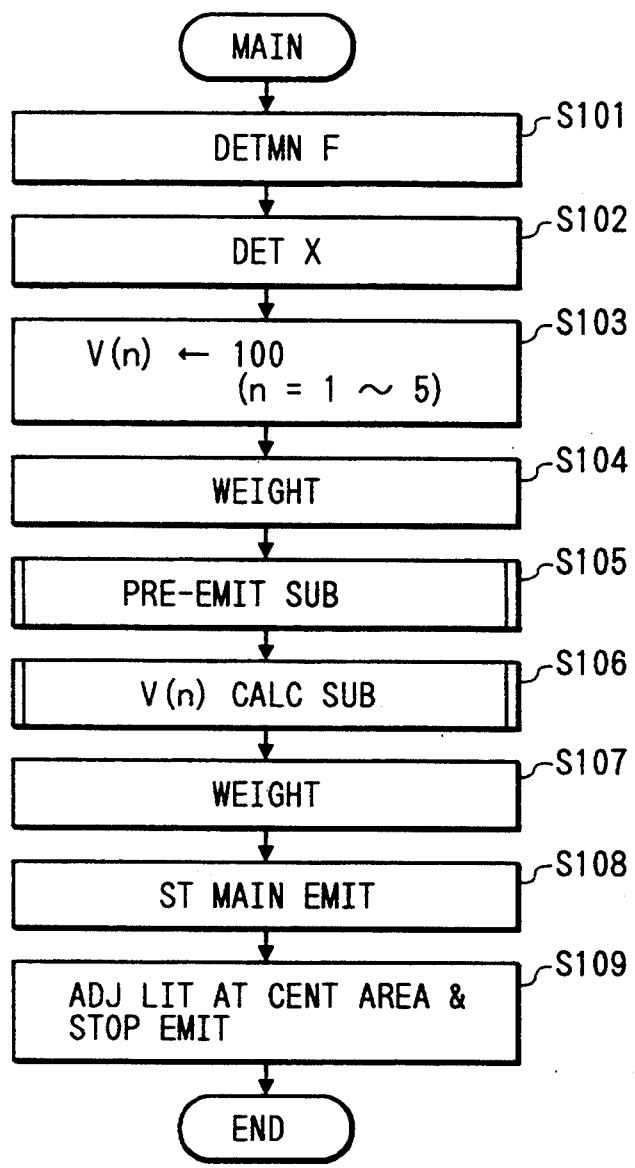
FIG. 21 is a flowchart showing the operations of an example of a main control program.

FIG. 21 is a flowchart showing an example of a main control program of a CPU 135. The operations of the embodiment will be described in conjunction with the flowchart.

When a shutter release button is pressed halfway and fully, the CPU 135 starts executing the main control program. When an automatic exposure mode is set, an f-number F is determined according to a well-known flowchart at a step 101, If a manual exposure mode is specified, a photographer-specific set value is read. At a step 102, an absolute distance encoder of a photographic lens 112, which is not shown, detects a photographic distance X or a distance from a main subject. At a step S103, 100 is specified as weighting voltages for pre-emission for interelectrode voltages V(n) (n=1 to 5) of a light distribution control element 139. As shown in FIG. 5, when the interelectrode voltages V(n) are set to 100, the light transmittances T(n) of the light distribution control element 139 become 0.8 or almost a maximum. Thus, pre-emission efficiency is maximized.

At a step S104, a light distribution control circuit 138 is controlled to apply the weighting voltage V(n)=100 (n=1 to 5) specified at the previous step between the electrodes of a light distribution control element 139. At a step S105, a subroutine to be described later is executed. Thereby, a flashlight 121 performs pre-emission prior to main emission, and a light receiving element 123 meters light reflected from a field during preemission in domains. At a step S106, a subroutine to be described later is executed. Thereby, weighting voltages V(n) for main emission are calculated using the results of photometry during pre-emission. At a step S107, the calculated weighting voltages V(n) for main emission are supplied between the electrodes of the light distribution control element 139 via the light distribution control circuit 138, thus weighting for main-emission is done in projection domains. At a step S108, main emission of the flashlight 121 starts. At a step S109, light adjustment is performed in a divided photometry domain 123a in the center of the light receiving element 123. Then, when a predetermined light adjustment level is attained, main emission of the flashlight 121 terminates.

Figure 22:
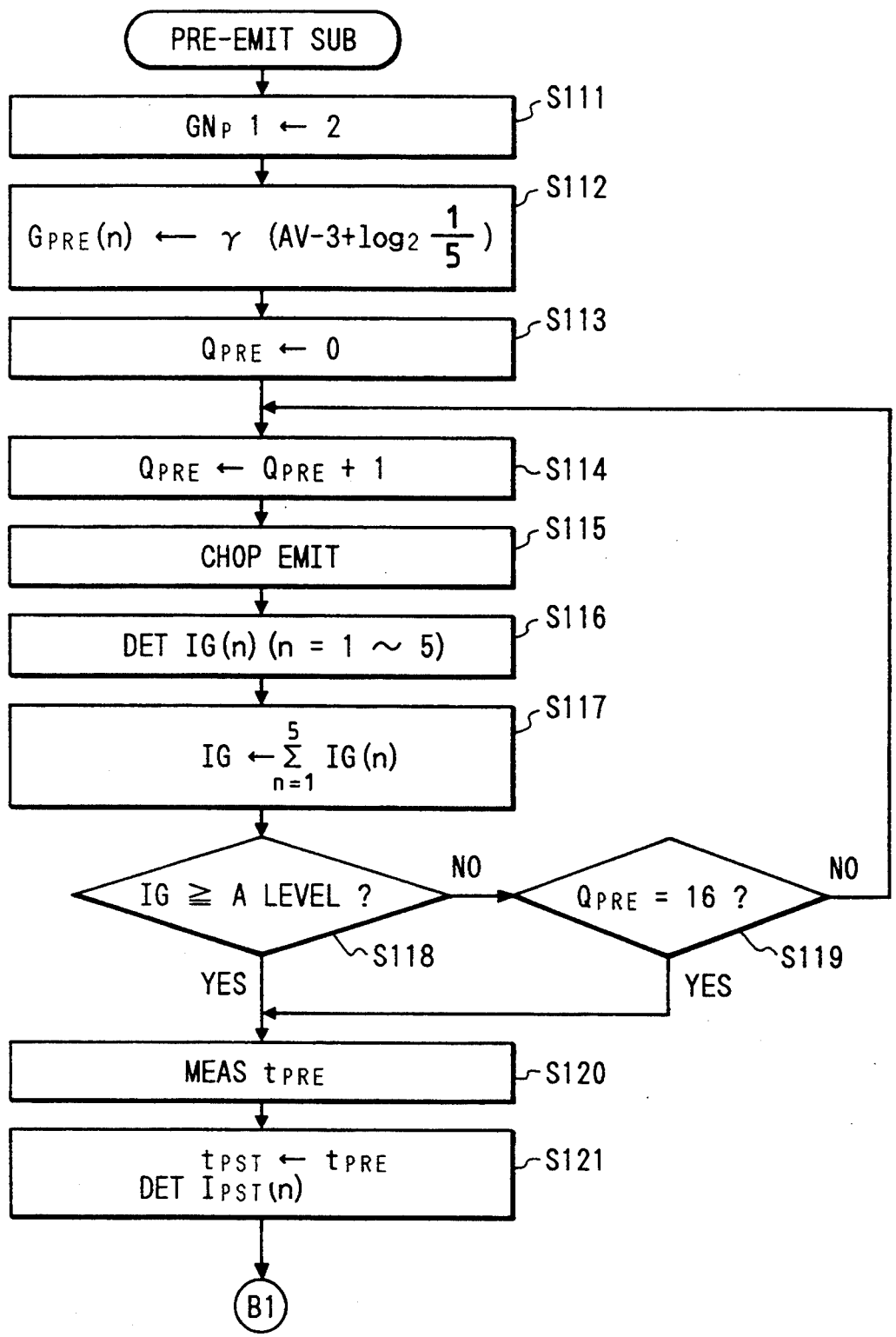
FIG. 22 is a flowchart showing the operations of a pre-emission subroutine.
Figure 23:
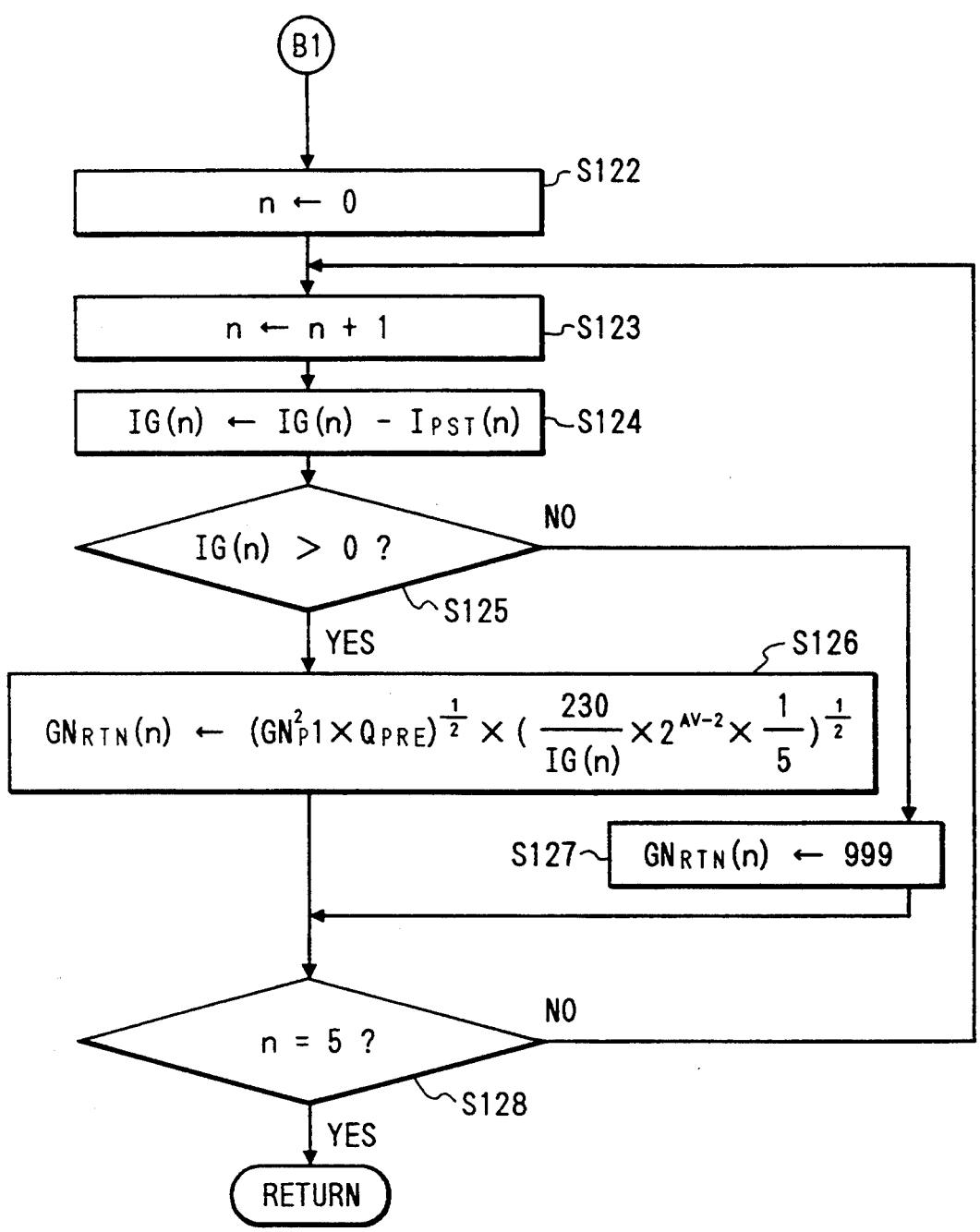
FIG. 23 is a flowchart showing the operations of a pre-emission subroutine.

FIGS. 22 and 23 are flowcharts showing the operations of a pre-emission subroutine.

At a step S111, 2 is specified as a guide number $GN_p1$ per pre-emission cycle. In this embodiment, chop emission specified with guide number 2 is performed several times during pre-emission. At a step S112, gains $G_{PRE}$(n) to be set in gain setters 142a to 142e of a light adjustment circuit 140 are calculated according to the following expression:

$$G_{PRE}(n) = \gamma(AV - 3 + \log_2(1/5)) \qquad (1)$$

where, $\gamma$ is a constant, and AV, an apex value for pre-emission.

At a step S113, a chop emission frequency counter $Q_{PRE}$ is reset. At a step S114, the counter $Q_{PRE}$ is incremented. At a step S115, chop emission of a flashlight 121 is executed with a guide number $GN_p1$ (=2) specified.

At a step S116, photometry is performed on chop emission light. That is to say, luminous flux emitted by the flashlight 121 and reflected from a field during chop emission is reflected from the curtain of a shutter 120 via a photographic lens 112, then received by five divided light receiving elements 123a to 123e via a condensor lens array 122. The divided light receiving elements 123a to 123e supply photometric signals whose levels are determined with the amounts of light the elements 123a to 123e have received to amplifiers 141a to 141e of a light adjustment circuit 133. The amplifiers 141a to 141e amplify these photometric signals by the gains $G_{PRE}$(n) specified in the gain setters 142a to 142e, then supply the amplified signals to integrating circuits 143a to 143e. A CPU 135 outputs activation signals to the integrating circuits 143a to 143e. In receipt of the activation signals, the integrating circuits 143a to 143e integrate the amplified photometric signals sent from the amplifiers 141a to 141e at their regular intervals, and place the integrated signals as photometric signals IG(n) (n=1 to 5) in the CPU 135.

At a step S117, a sum total IG of photometric signals IG(n) originating from the five divided photometry domains of a light receiving element 123 is calculated. It is determined at a step S118 whether the sum total IG of photometric signals has reached a predetermined light adjustment level. If the sum total IG has reached the adjustment level, control passes to a step S120. If the sum total IG has reached the adjustment level, control passes to a step S119. When it is determined at the step S118 that the sum total IG has not reached the predetermined light adjustment level, it is determined at the step S119 whether 16 is specified as the chop emission frequency $Q_{PRE}$. If 16 is specified, control passes to the step S120. If 16 is not specified, control returns to the step S114. When the sum total IG of photometric signals reaches the predetermined light adjustment level or 16 is specified as the chop emission frequency $Q_{PRE}'$ control passes to the step S120. Then, the total photometry time $t_{PRE}$ required for pre-emission photometry is measured. At a step S121, stationary light is metered using the same optical systems as pre-emission light of the flashlight 121 is. Then, metered values $I_{PST}$(n) are obtained. The stationary light photometry time $t_{PST}$ is set to be the same value as the total photometry time $t_{PRE}$.

At steps S122 to S128 in FIG. 23, compensating for stationary light components and calculating guide numbers $GN_{RTN}$ are performed on five divided photometry domains of a light receiving element 123. First, at a step S122, a domain number n is cleared. Then, n is incremented at a step S123. At a step S124, a stationary light component $I_{PST}$ is subtracted from a photometric signal IG(n) sent from a flashlight 121 that contains a pre-emission component and a stationary light component, then the subtracted photometric signal IG(n) is compensated for the stationary light component to produce a photometric signal IG(n). It is determined at a step S125 whether the compensated photometric signal IG(n) is positive. If it is positive, control passes to a step S126. If it is not positive, control passes to a step S127. At the step S126, a $GN_{RTN}$ value is calculated according to the following expression:

$$GN_{RTN}(n) = (GN_p{}^2 \times Q_{PRE})^{\frac{1}{2}} \times (230/IG(n) \times 2^{AV-2} \times 1/5)^{\frac{1}{2}} \qquad (2)$$

According to the expression (2), when a subject in a domain has a standard reflectance, $GN_{RTN}$(n) for the domain is provided as a product of an f-number F by a photographic distance X. In other words, a domain represented as $F \times X = GN_{RTN}$(n) is thought to contain a subject having a standard reflectance at a position of the photographic distance X in. In a domain represented as $F \times X > GNRTN(n)$, an object having a higher reflectance than the standard reflectance resides at a position of the photographic distance X. In a domain of $F \times X < GNRTN(n)$, an object having a lower reflectance than the standard reflectance resides at a position of the photographic distance X. On the other hand, when it is determined at the step S125 that the photometric signal IG(n) is not positive, a very large number or a nearly infinite value, 999 in this example, is specified in $GN_{RTN}$(n). Then, control passes to a step S128. At the step S128, it is determined whether the domain number n specifies 5 or whether the above processing has performed on all the divided photometry domains. If the processing has performed on all the divided photometry domains, control returns to the main program.

Figure 24:
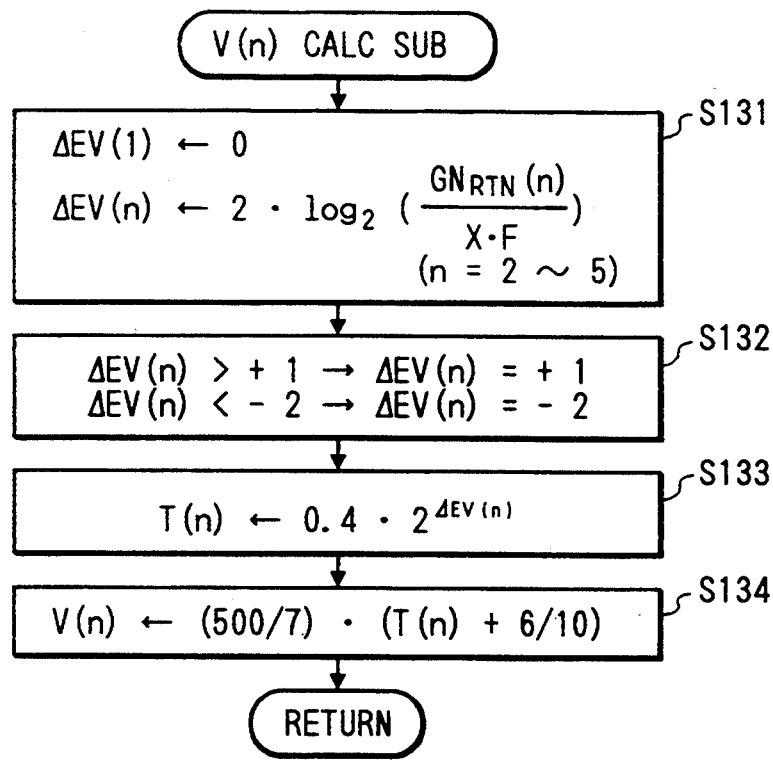
FIG. 24 is a flowchart showing the operations of a weighting voltage calculation subroutine for main emission.

FIG. 24 is a flowchart showing the operations of a weighting voltage calculation subroutine for main emission. In principle, when $\Delta EV(n) = 0$, a quantity of radiation is set to a standard quantity of radiation. If $\Delta EV(n) > 0$, a quantity of radiation is set to be larger than the standard quantity of radiation. If $\Delta EV(n) < 0$, a quantity of radiation is set to be smaller than the standard quantity of radiation.

At a step S131, the photographic distance and $GN_{RTN}$ values obtained after focusing is achieved are used to calculate the quantities of radiation to be corrected for domains. The quantity of radiation correction $\Delta EV(1)$ for a central divided photometry domain corresponding to a light receiving element 123a is given by:

$$\Delta EV(1) = 0 \tag{3}$$

The quantities of radiation correction $\Delta EV(n)$ (n=2 to 5) for divided photometry domains corresponding to light receiving elements 123b to 123e are represented as follows:

$$\Delta EV(n) = 2 \times \log_2 (GN_{RTN}(n)/(X \times F)) \tag{4}$$

At a step S132, quantities of correction are limited by executing Limit. This is because an extremely large quantity of correction may result in irregular light distribution. That is to say, when $\Delta EV(n)$ is larger than +1, $\Delta EV(n) = +1$ is specified. When $\Delta EV(n)$ is smaller than −2, $\Delta EV(n) = -2$ is specified. The limit value differs depending on the sign. This intends to prevent their closest values from causing over-exposure. At a step S133, light transmittances of projection domains of a light distribution control element 39 are calculated using the calculated $\Delta EV(n)$ values.

$$T(n) = 0.4 \times 2^m \tag{5}$$

where, m equals to $\Delta EV(n)$.

Next, at a step S134, the calculated light transmittances $T(n)$ are assigned to the function shown in FIG. 5 to calculate weighting voltages $V(n)$ a light distribution control circuit 138 applies between the electrodes of the light distribution control element 139.

$$V(n) = (500/7) \times (T(n) + 6/10) \tag{6}$$

Thus, light reflected from subjects during pre-emission is metered in divided domains to detect spatial distribution of the subjects. A flash emitted by a single flash tube is distributed according to the detected spatial distribution of the subjects. Therefore, optimal amounts of light are radiated to all the subjects distributed in a field.

In the aforesaid embodiment, a TTL light adjustment system is adopted. The present invention is not limited to the TTL light adjustment system but may apply to an external metering or flashmatic system.

A pattern of divided photometry domains of an exposure control photometry element, a pattern of divided photometry domains of a light adjustment light receiving element, and shapes and arrangement of focus detection domains are not restricted to those in the aforesaid embodiment.

In the configuration of the aforesaid embodiment, a flashlight 121 serves as a flashing means or a divided radiation type flashlight. A light adjustment light receiving element 123 and a light adjustment circuit 133 act as a divided photometry means. A CPU 135 serves as a calculating and control means.

As described previously, according to the present invention, light reflected from subjects during pre-emission is metered in multiple divided domains. Quantities of weight are calculated for the multiple projection domains using the results of photometry. A flash emitted by a single light emission port during main emission is weighted by the calculated quantities of weight for the multiple projection domains, and thus emitted to the subjects. Thereby, the following advantages are provided:

(1) a whole flashlight is designed to be compact and lightweight, (2) required energy is reduced and heat dissipation during continuous operation is minimized, (3) overlapping or missing radiation does not occur on borders of divided domains, unlike conventional flashlights, thus preventing irregular light distribution, and (4) only one light adjustment circuit is required, thus realizing simple control circuitry. In addition, flashes having optimal amounts of light can be radiated uniformly to all subjects including far and near subjects that are distributed in a field. Every part of a photographic screen will be exposed optimally during flashlight photography.

A pattern of divided photometry domains of a divided photometry means is almost the same as a pattern of divided projection domains of a flashing means. This makes it possible to reliably match the spatial distribution of subjects that is detected using metered values obtained during pre-emission and the light distribution of a flashlight for main emission. Thus, all subjects in a photographic screen can be exposed optimally to achieve flashlight photography.

Figure 25:
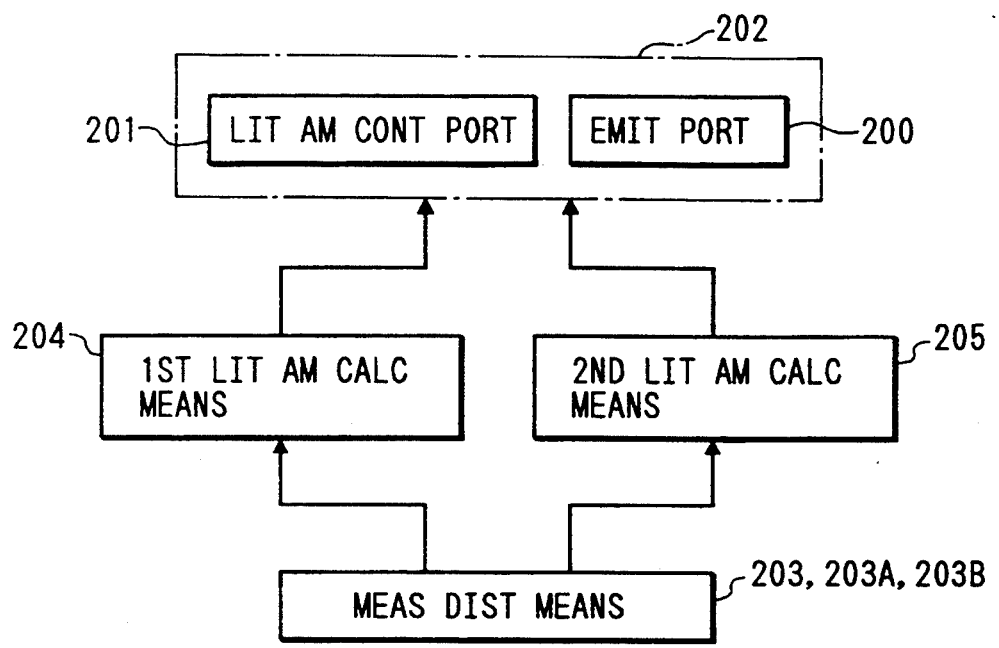
FIGS. 25 and 26 show other embodiments of the present invention.

Another embodiment will be described in conjunction with FIG. 25. This embodiment includes a flashing means 202 made up of a light emission port 200, and a light amount control port 201 for controlling the amounts of radiation light originating from the light emission port 200 for multiple divided domains of a field according to light amount signals, comprising a distance measuring means 203 for measuring subject distances from distance measuring domains or multiple divided domains of a field, a first light amount calculating means 204 for calculating the amounts of radiation light for radiation domains corresponding to the distance measuring domains using the subject distances from measurable distance measuring domains the distance measuring means 203 can handle, and outputting light amount signals to the flashing means 202, and a second calculating means 205 for calculating the amounts of radiation light for radiation domains corresponding to unmeasurable distance measuring domains using the subject distances from measurable distance measuring domains, and outputting light amount signals to the flashing means 202.

A distance measuring means 203A of a divided radiation type flashlight system detects state values of focal adjustment in a photographic lens, and calculates subject distances from distance measuring domains using the results of the detection.

Unmeasurable distance measuring domains of a distance measuring means 203B of a divided radiation type flashlight system are distance measuring domains containing low-contrast subjects.

Figure 26:
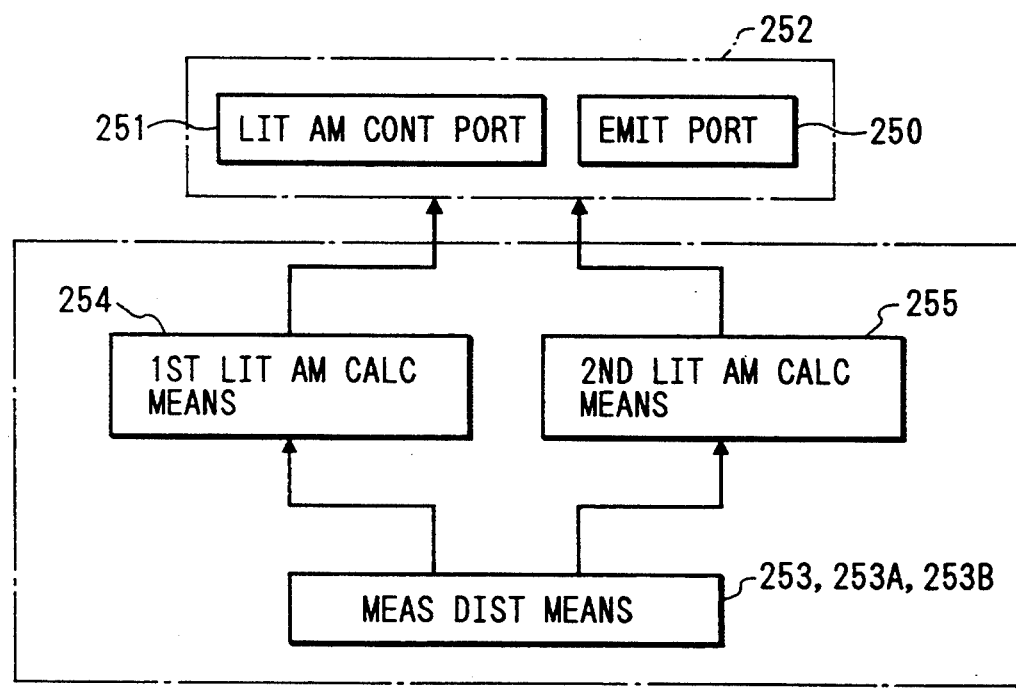

Another embodiment will be described in conjunction with FIG. 26. This embodiment is a camera capable of loading a divided radiation type flashlight 252 made up of a light emission port 250, and a light amount control port 251 for controlling the amounts of radiation light originating from the light emission port 250 for radiation domains or multiple divided domains of a field according to light amount signals, comprising a distance measuring means 253 for measuring subject distances from distance measuring domains or multiple domains of a field, a first light amount calculating means 254 for calculating the amounts of radiation light for radiation domains corresponding to the distance measuring domains using the subject distances of measurable distance measuring domains the distance measuring means 253 can handle, and outputting light amount signals to a divided radiation type flashlight 252, and a second calculating means 255 for calculating the amounts of radiation light for radiation domains corresponding to unmeasurable distance measuring domains using the subject distances of measurable domains, and outputting light amount signals to the divided radiation type flashlight 252.

A distance measuring means 253A for a camera capable of loading a divided radiation type flashlight detects state values of focal adjustment in a photographic lens, and calculates subject distances from distance measuring domains using the results of the detection.

Unmeasurable distance measuring domains of a distance measuring means 253B for a camera capable of loading a divided radiation type flashlight are distance measuring domains containing low-contrast subjects.

Other embodiment is a divided radiation type flashlight made up of a light emission port, and a light amount control port for controlling the amounts of radiation light originating from the light emission port for radiation domains or multiple divided domains of a field. The light amount control port measures subject distances from multiple divided domains of a field, inputs the amounts of radiation light for radiation domains corresponding to measurable distance measuring domains that are calculated using the subject distances of the measurable distance measuring domains and the amounts of radiation light for radiation domains corresponding to unmeasurable distance measuring domains that are calculated using the subject distances of the measurable distance measuring domains, and controls the amounts of radiation light originating from the light emission port for the radiation domains or multiple divided domains according to the amounts of radiation light.

The subject distances are calculated using the results of detecting state values of focal adjustment in a photographic lens.

Furthermore, unmeasurable distance measuring domains are distance measuring domains containing low-contrast subjects.

A first light amount calculating means 204 calculates the amounts of radiation light for radiation domains corresponding to measurable distance measuring domains using the subject distances from measurable distance measuring domains, and outputs light amount signals to a flashing means 202. A second calculating means 205 calculates the amounts of radiation light for radiation domains corresponding to unmeasurable distance measuring domains using the subject distances from measurable distance measuring domains, and outputs light amount signals to the flashing means 202. A light amount control port 201 of the flashing means 202 controls the amounts of radiation light originating from a light amount control port 200 for radiation domains or multiple divided domains of a field according to the light amount signals.

A first light amount calculating means 254 calculates the amounts of radiation light for radiation domains corresponding to measurable distance measuring domains using the subject distances from the measurable distance measuring domains, and outputting light amount signals to a divided radiation type flashlight 252. A second calculating means 255 calculates the amounts of radiation light for radiation domains corresponding to unmeasurable distance measuring domains using the subject distances from the measurable distance measuring domains, and outputting light amount signals to the divided radiation type flashlight 252. A light amount control port 251 of the divided radiation type flashlight 252 controls the amounts of light originating from a light emission port 250 for the radiation domains or multiple divided domains of a field according to the light amount signals.

A light amount control port measures subject distances from multiple divided domains of a field, inputs the amounts of radiation light for radiation domains corresponding to measurable distance measuring domains that are calculated using the subject distances from the measurable distance measuring domains and the amounts of radiation light for radiation domains corresponding to unmeasurable distance measuring domains that are calculated using the subject distances from the measurable distance measuring domains, and controls the amounts of radiation light originating from the emission port for the radiation domains according to the amounts of radiation light.

Figure 27:
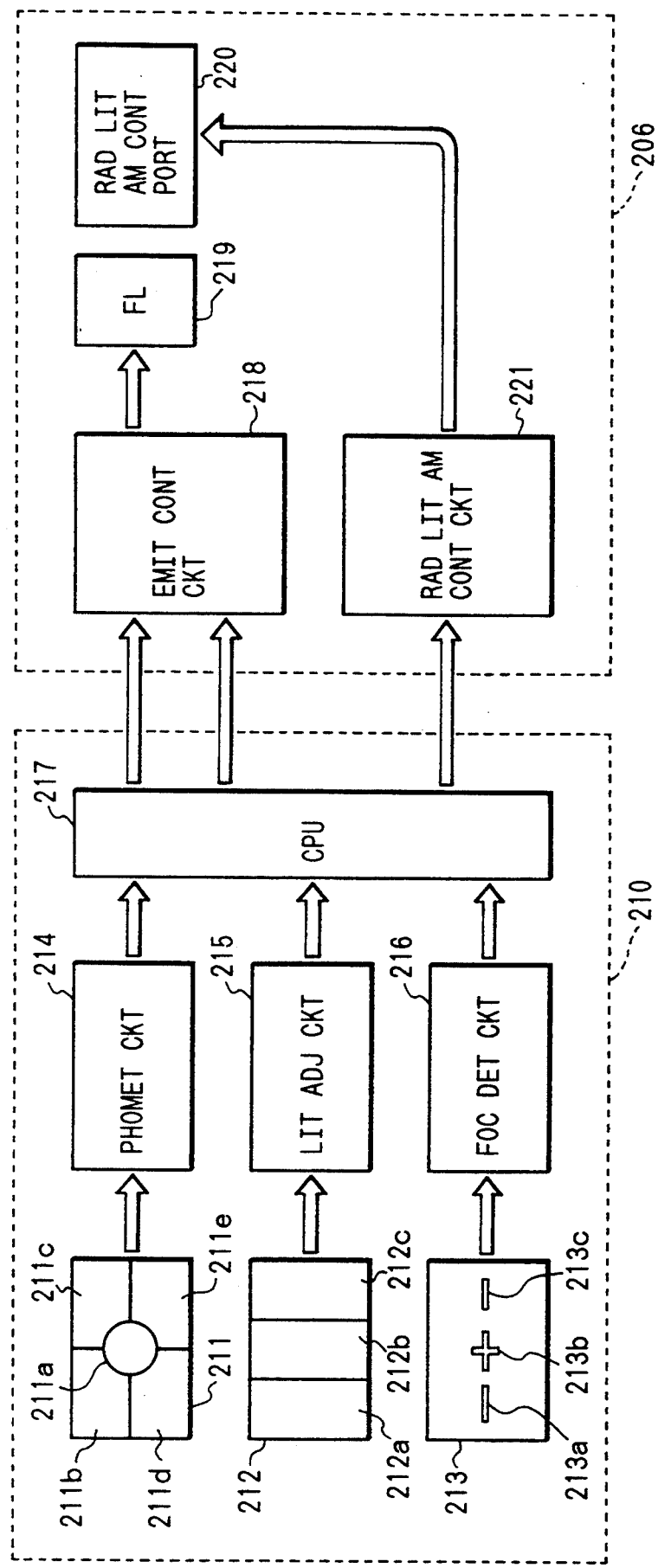
FIG. 27 is a block diagram showing a configuration of another embodiment.

FIG. 27 is a block diagram showing a configuration of a camera and a flashlight in another embodiment.

A camera 210 comprises a stationary light photometer 211, a flash photometer 212, a focus detector 213, a photometric circuit 214, a light adjustment circuit 215, a focus detecting circuit 216, and a microcomputer 217 (hereafter, CPU). Other components of the camera 210 that have no direct relation to this invention are not illustrated. The description will be omitted.

A stationary light photometer 211 meters luminous flux (mainly, stationary light) passing through a photographic lens that is not shown in five stationary light photometry domains 211a to 211e as shown in FIG. 27. A flash photometer 212 meters luminous flux (mainly, flash) passing through the photographic lens in three flash photometry domains 212a to 212c as shown in FIG. 27. A focus detector 213 uses the luminous flux passing through the photographic lens to detect foci in three focus detection domains 213a to 213c as shown in FIG. 27. The focus detection domains 213a to 213c correspond to the aforesaid distance measuring domains.

Herein, the focus detection domain 213a is included in the flash photometry domain 212a, the focus detection-domain 213b, in the flash photometry domain 212b, and the focus detection domain 213c, in the flash photometry domain 213c.

A photometric circuit 214 compresses the outputs of the stationary light photometer 211 logarithmically, and converts the compressed outputs into luminance values. A light adjustment circuit 215 amplifies the outputs of the flash photometer 212, and integrates the amplified outputs at regular intervals. A focus detecting circuit 216 uses the outputs of the focus detector 213 to calculate amounts of focal aberration and aberrant directions.

A CPU 217 executes a control program similar to that in the aforesaid embodiment by setting the outputs of the photometric circuit 214, light adjustment circuit 215, and focus detecting circuit 216, and controls light emission and light distribution of a flashlight 206.

The flashlight 206 comprises a light emission control circuit 218, a flash tube 219, a radiation light amount control port 220, and a radiation light amount control circuit 221. Other components of the flashlight that have no direct relation to the present invention are not illustrated. The description will be omitted.

A light emission control circuit 218 starts or stops light emission of a flash tube 219 in response to an instruction signal of a CPU 217.

A radiation light amount control port 220 is located forward of a flash tube 219 and controls the amounts of projection light of the flash tube 219 for radiation domains or multiple divided domains of a field. The radiation light amount control circuit 221 energizes the radiation light amount control port 220 according to the amounts of projection light for radiation domains in response to instruction signals sent from the CPU 217, and controls the light distribution of a flash originating from the flash tube 219 over the field.

Thus, a single flash tube is employed, and an amount of projection light originating from the flash tube is controlled differently among radiation domains of a field. This realizes a compact and lightweight design, reduces required energy, and minimizes heat dissipation during continuous operation. Overlapping or missing radiation does not occur on the borders of the divided radiation domains, thus preventing irregular light distribution. Since only one light adjustment circuit is required, simple control circuitry is realized.

Based on the results of distance measurement for distance measuring domains, spatial distribution of subjects is understood, then an amount of radiation light is controlled differently among radiation domains corresponding to the distance measuring domains according to the spatial distribution. For example, a distance measuring domain may be unmeasurable because of the low-contrast subject. In this case, subject distances from measurable domains are used to calculate an amount of radiation light for a radiation domain corresponding to the unmeasurable distance measuring domain. Thereby, far and near subjects alike can be illuminated uniformly.

When subject distances from distance measuring domains are calculated using the results of detecting state values of focal adjustment in a photographic lens, an ordinary focus detector can be used as a distance measuring means, and a special distance measuring means is unnecessary.

In the aforesaid embodiment, a focus detector and a focus detecting circuit are employed as distance measuring means. The alternatives include a distance measuring means for measuring the propagation time required for light to propagate to a subject using ultrasound, or a distance measuring means based on a passive or active type trigonometrical survey.

In the aforesaid embodiment, three focus detection domains are created in a photographic scene, and a field is divided into three radiation domains that include the focus detection domains one by one. The arrangement and number of focus detection domains, and the shapes and number of divided radiation domains are not restricted to those in the aforesaid embodiment. Moreover, the number of focus detection domains may not necessarily be the same as the number of divided radiation domains.

In the aforesaid embodiment, a radiation light adjustment member is made of transparent ceramic PLZT. Alternatively, a liquid crystal or electrochromic display (ECD) may be employed.

As described so far, according to the present invention, a single light emission port is employed, an amount of projection light originating from the light emission port is controlled differently among radiation domains of a field, then radiation is done. This provides the following advantages:

(1) a whole flashlight is designed to be compact and lightweight,
(2) required energy is reduced, and heat dissipation during continuous operation is minimized,
(3) overlapping or missing radiation does no occur on borders of divided domains, unlike conventional flashlights, thus preventing irregular light distribution, and
(4) only one light adjustment circuit is required, thus realizing simple control circuitry.

According to the present invention, the spatial distribution of subjects is understood based on the results of distance measurement in distance measuring domains, and an amount of radiation light is controlled differently among radiation domains corresponding to the distance measuring domains according to the spatial distribution. Moreover, when a distance measurement domain is unmeasurable because of the low-contrast subject, the subject distances from measurable domains are used to calculate an amount of radiation light for a radiation domain corresponding to the unmeasurable domain. Thus, far and near subjects alike can be illuminated almost uniformly.

When the subject distances from distance measuring domains are calculated using the results of detecting state values of focal adjustment in a photographic lens, an ordinary focus detector can be used as a distance measuring means, and a special distance measuring means need not be installed.

In the aforesaid embodiment, when the light distribution angle of a divided radiation type flashlight differs from the angle of view of a photographic lens, the following problems arise:

(1) When the light distribution angle of a divided radiation type flashlight is larger than the angle of view of a photographic lens, the flashlight meters light within the angle of view of the photographic lens. This results in a failure in acquiring photometric information necessary for determining the amounts of radiation for all domains within the light distribution angle of the flashlight.
(2) When the light distribution angle of a divided radiation type flashlight is smaller than the angle of view of a photographic lens, photometric information concerning domains within the light distribution angle of the flashlight must be selected from photometric information acquired within the angle of view of the photographic lens to determine the amounts of radiation for all domains.

An embodiment for solving the above problems will be described below.

Figure 28:
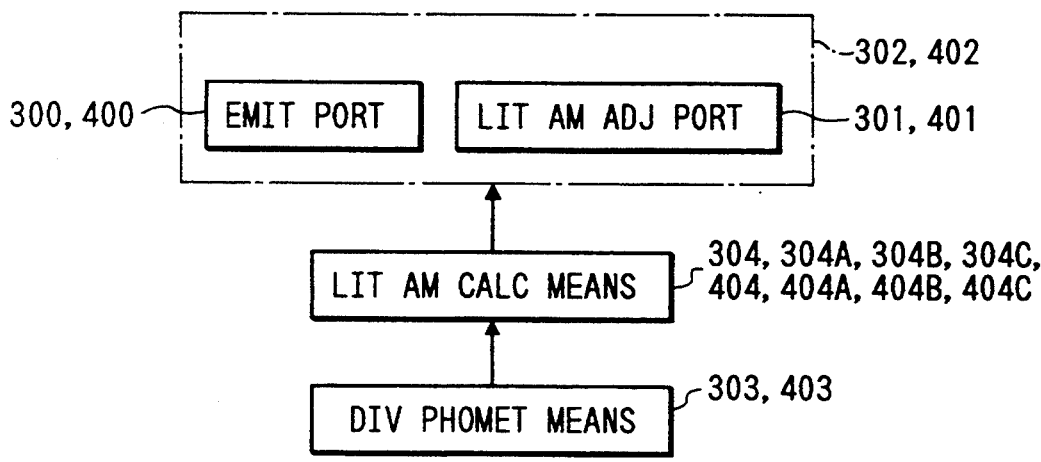
FIG. 28 shows another embodiment of the present invention.

The embodiment will be described in conjunction with FIG. 28. To solve the aforesaid problems, the embodiment comprises a flashing means 302 made up of a light emission port 300, and a light amount control port 301 arranged forward of the light emission port 300 and capable of controlling the amounts of light originating from projection domains corresponding to multiple radiation domains of a field, and performing pre-emission and main emission, a divided photometry means 303 for metering luminous flux emitted by the flashing means 302 and reflected from a field in multiple photometric domains, and a light amount calculating means 304 for calculating the amounts of projection light for projection domains of the light amount adjustment port 301 using the results of the photometry by the divided photometry means 303 during pre-emission of the flashing means 302, and the angle of view of a photographic lens and the light distribution angle of the flashing means 302.

When the light distribution angle of a flashing means 302 is smaller than the angle of view of a photographic lens, a light amount calculating means 304A of a divided radiation type flashlight system calculates the amounts of projection light for projection domains using the results of photometry a divided photometry means 303 acquires within the light distribution angle of the flashing means 302.

When the light distribution angle of the flashing means 302 is larger than the angle of view of the photographic lens, a light amount calculating means 304B of the divided radiation type flashlight system calculates the amounts of projection light for projection domains using the results of photometry the divided photometry means 303 acquires within the angle of view of the photographic lens.

When the light distribution angle of the flashing means 302 is larger than the angle of view of the photographic lens and the difference exceeds a predetermined value, a light amount calculating means 304C of the divided radiation type flashlight system specifies predetermined values as the amounts of projection light for projection domains.

Another embodiment is a camera capable of loading a divided radiation type flashlight 402 made up of a light emission port 400, and a light amount control port 401 arranged forward of the light emission port 400 and capable of controlling the amounts of light originating from projection domains corresponding to multiple radiation domains of a field, and performing pre-emission and main emission. To solve the aforesaid problems, the camera further comprises a divided photometry means 403 for metering luminous flux emitted by the divided radiation type flashlight 402 and reflected from the field for multiple divided photometry domains, and a light amount calculating means 404 for calculating the amounts of projection light for the projection domains of the light amount control port 401 using the results of photometry the divided photometry means 403 acquires during pre-emission of the divided radiation type flashlight 402, and the angle of view of a photographic lens and the light distribution angle of the divided radiation type flashlight 402.

When the light distribution angle of a divided radiation type flashlight 402 is smaller than the angle of view of a photographic lens, a light amount calculating means 404A for a camera capable of loading a divided radiation type flashlight system calculates the amounts of projection light for projection domains using the results of photometry the divided photometry means 403 has acquired within the light distribution angle of the divided radiation type flashlight 402.

When the light distribution angle of the divided radiation type flashlight 402 is larger than the angle of view of the photographic lens, a light amount calculating means 404B for a camera capable of loading a divided radiation type flashlight calculates the amounts of projection light for projection domains using the results of photometry the divided photometry means 403 has acquired within the angle of view of the photographic lens.

When the light distribution angle of the divided radiation type flashlight 402 is larger than the angle of view of the photographic lens and the difference exceeds a predetermined value, a light amount calculating means 404C for a camera capable of loading a divided radiation type flashlight specifies predetermined values as the amounts of projection light for projection domains.

A light amount calculating means 304 calculates the amounts of projection light for projection domains of a light amount control port 301 using the results of the photometry by a divided photometry means 303 during pre-emission of a flashing means 302, and the angle of view of a photographic lens and the light distribution angle of the flashing means 302. The light amount control port 301 arranged forward of a light emission port 300 of the flashing means 302 controls the amounts of light originating from projection doamins corresponding to multiple radiation domains of a field.

A light amount calculating means 404 calculates the amounts of projection light for projection domains of a light amount control port 401 using the results of the photometry by a divided photometry means 403 during pre-emission of a divided radiation type flashlight 402, and the angle of view of a photographic lens and the light distribution angle of a divided radiation type flashlight 402. A light amount control port 401 located forward of a light emission port 400 of the divided radiation type flashlight 402 controls the amounts of light originating from projection domains corresponding to multiple radiation domains of a field.

Figure 29:
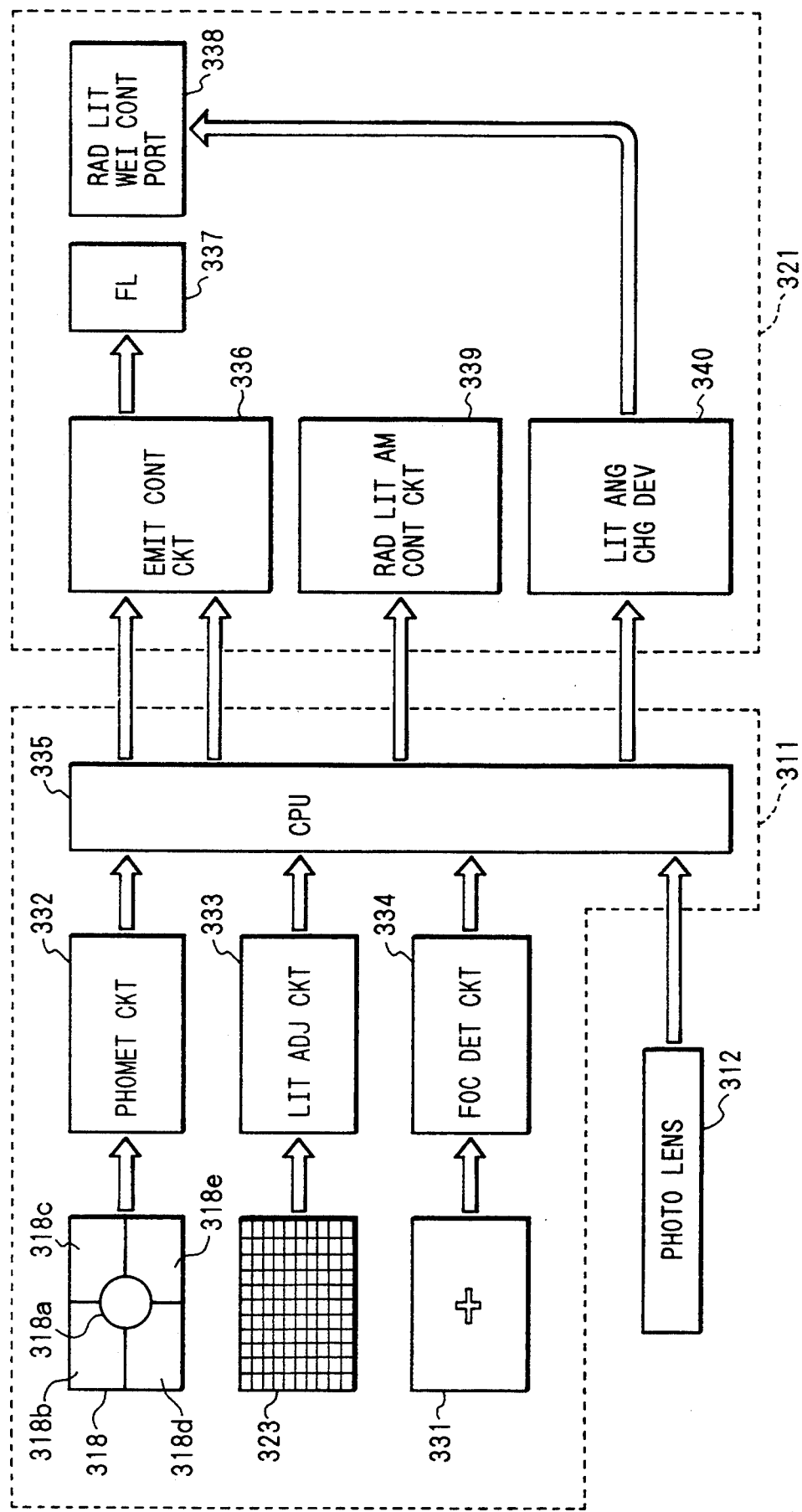
FIG. 29 is a block diagram showing a configuration of another embodiment.

FIG. 29 is a block diagram showing a configuration of a camera and a flashlight of another embodiment. The camera has the same configuration as that shown in FIG. 16.

Incorporated in a camera 311 are an exposure calculation photometric element 318, a light adjustment light receiving element 323, a focus detector 331, a photometry circuit 332, a light adjustment circuit 333, a focus detecting circuit 334, and a microcomputer (hereinafter, CPU) 335.

An exposure calculation photometric element 318 meters luminous flux (mainly, stationary light) passing through a photographic lens 312 in five stationary light photometry domains 318a to 318e as shown in FIG. 29. A light adjustment light receiving element 323 meters luminous flux (mainly, flash) passing through the photographic lens 312 in 64 domains of 8 domains longitudinally by 8 domains laterally as shown in FIG. 29. A focus detector 331 uses the luminous flux passing through the photographic lens 312 to detect foci in a cruciform focus detection domain in the center of the photographic screen as shown in FIG. 29.

A photometry circuit 332 logarithmically compresses the outputs of the exposure calculation photometric element 318, and converts the compressed outputs to luminance values. A light adjustment circuit 333 amplifies the outputs of the light adjustment light receiving element 323, and integrates the amplified outputs at regular intervals. A focus detection circuit 334 calculates the quantities of focal aberration and aberrant directions of the photographic lens 312 using the results of detection the focus detector 331 provides.

A CPU 335 executes a control program to be described later according to the outputs of the photometry circuit 332, light adjustment circuit 333, and focus detecting circuit 334, and controls light emission and distribution of a flashlight 321.

In the flashlight 321, an emission control circuit 336, a flash tube 337, a radiation light amount control port 338, a radiation light amount control circuit 339, and a light distribution angle varying device 340 are incorporated.

A light emission control circuit 336 starts or stops light emission of a flash tube 337 in response to an instruction signal from a CPU 335.

A radiation light amount control port 338 is arranged forward of a flash tube 337 and controls the amounts of projection light of the flash tube 337 for projection domains corresponding to multiple radiation domains of a field.

A radiation light amount control circuit 339 applies voltages associated with amounts of projection light for projection domains or projection light amount instruction voltages to a radiation light amount control port 338 in response to an instruction signal from a CPU 335, and controls light distribution of a flash from a flash tube 337 over a field.

A light distribution angle varying device 340 allows a flashlight 321 to automatically vary a light distribution angle in association with a change in the focal distance fL of a photographic lens 312. Hereafter, the distribution angle will be represented as a corresponding focal distance fSB of the photographic lens 312.

In this embodiment, the variable range of the light distribution angle of a flashlight 321 is 28 to 70 mm. When the focal distance of the photographic lens 312 is less than 28 mm, the light distribution angle of the flashlight 321 is set to 28 mm. When the focal distance of the photographic lens 312 exceeds 70 mm, the light distribution angle of the flashlight 321 is set to 70 mm.

Figure 30:
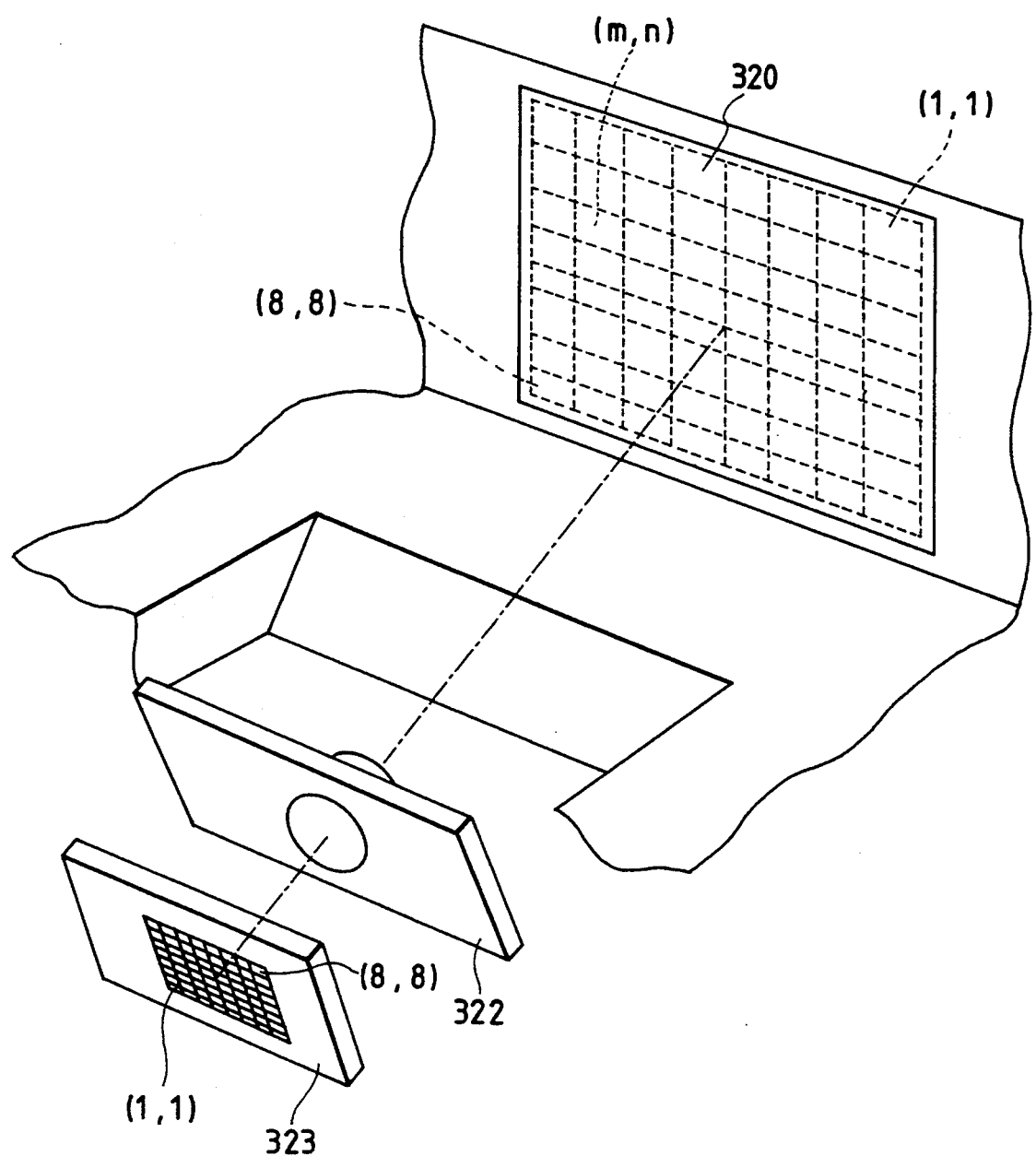
FIG. 30 is an explanatory diagram for explaining a light receiving operation of a light adjustment light receiving element.

FIG. 30 is an explanatory diagram for explaining the light receiving operation of a light adjustment light receiving element 323.

A subject image formed on film is an upsidedown image of an actual subject in a field. Assume that a rightmost address on the bottom of a field on film (bottom of FIG. 30) is (1, 1), a leftmost address on the top, (8, 8), and an address of an arbitrary position, (m, n). Herein, m represents a lateral position, and n, a vertical position.

Luminous flux that is reflected from the film surface is condensed on a light adjustment light receiving element 323 arranged on a plane associated with the film surface by a condenser lens 322. The light receiving element 323 meters brightness of the film surface separately in 64 domains.

The addresses of 64 domains of the light adjustment light receiving element 323 are specified in the same manner as those of a field on the film surface. The address of a rightmost photometric domain on the bottom is (1, 1), and the address of a leftmost photometric domain, (8, 8).

Figure 31:
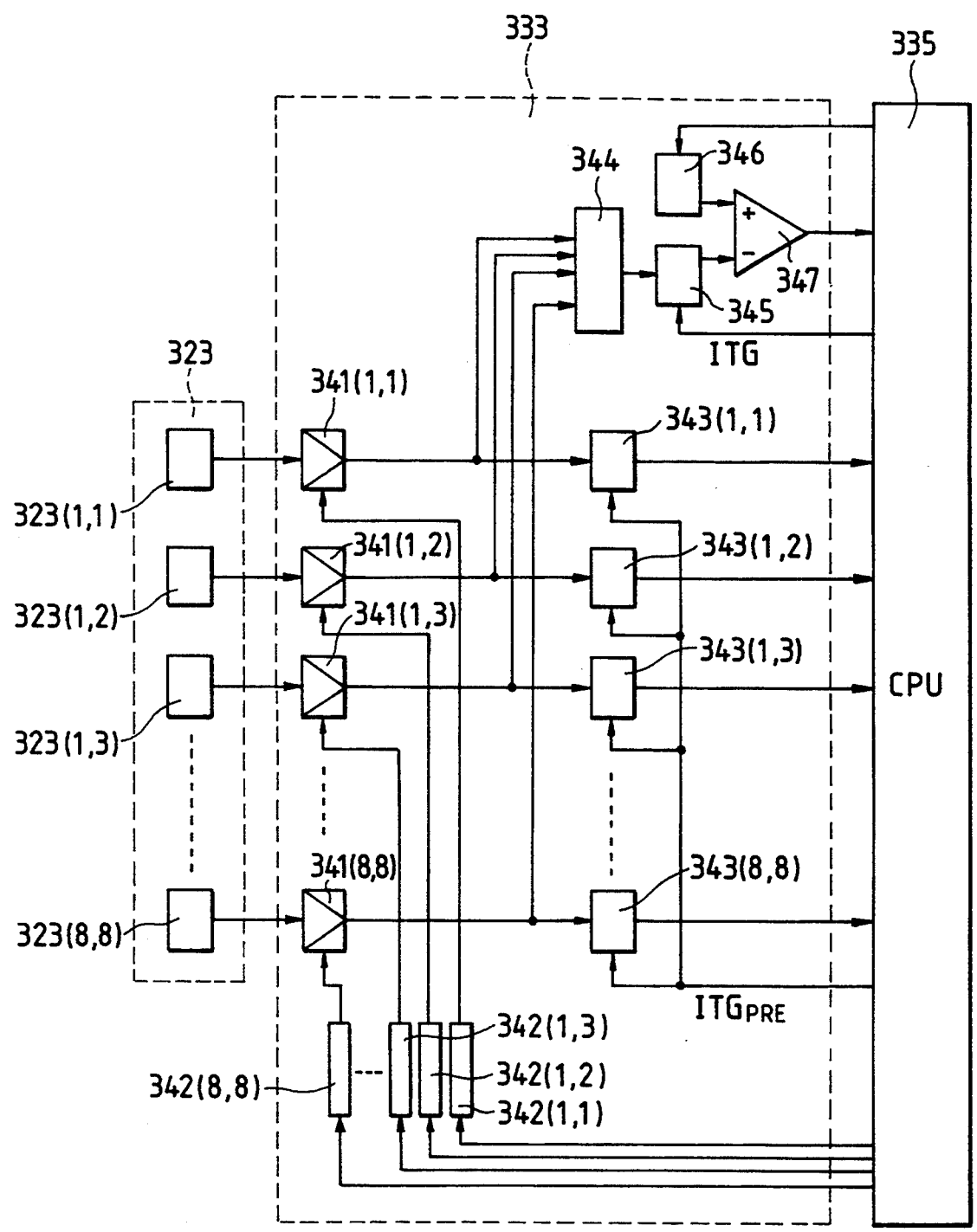
FIG. 31 is a circuit diagram showing a light adjustment circuit in detail.

FIG. 31 is a circuit diagram showing a light adjustment circuit 333 in detail. The light adjustment circuit 333 includes amplifiers 341(1, 1) to 341(8, 8) for amplifying the outputs of 64 divided domains 323(1, 1) to 323(8, 8) of a light adjustment light receiving element 323, and gain setters 342(1, 1) to 342(8, 8) for setting amplification factors for the amplifiers 341(1, 1) to 341(8, 8) in response to instructions from a CPU 335. The gain setters 342(1, 1) to 342(8, 8) have built-in D/A converters for converting digital signals sent from the CPU 335 into analog signals.

The light adjustment circuit 333 further comprises integrating circuits 343(1, 1) to 343(8, 8) for integrating the outputs the amplifiers 341(1, 1) to 341(8, 8) provide during pre-emission at regular intervals in response to instructions from a CPU 335, an adding circuit 344 for adding the outputs the amplifiers 341(1, 1) to 341(8, 8) provide during main emission, a integrating circuit 345 for integrating the results of the addition by the adding circuit 344 at regular intervals in response to an instruction from the CPU 335, a converter 346 for converting light adjustment level data already existent in the CPU 335 into an analog signal, and a comparator 347 for comparing the converted light adjustment level with the output of the integrating circuit 345, and outputting an emission stop signal when the output of the integrating circuit 345 reaches the light adjustment level.

Figure 32:
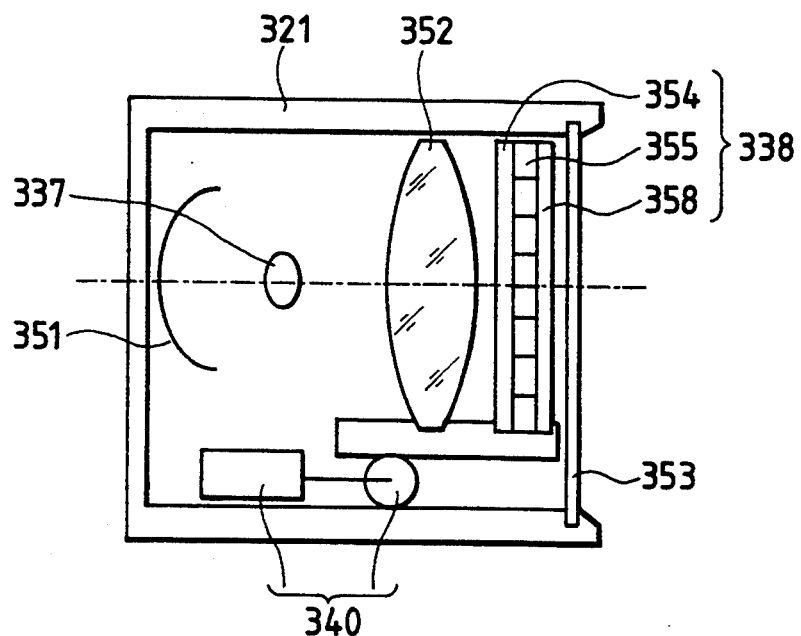
FIG. 32 is a configuration diagram of a flashlight of another embodiment.
Figure 33:
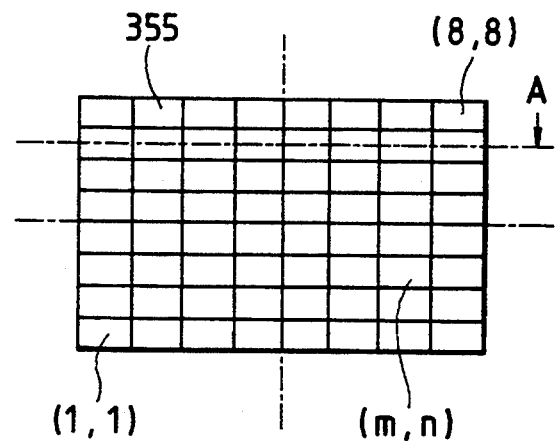
FIG. 33 shows projection domains of a radiation light control port.

FIG. 32 is a cross-sectional diagram showing a configuration of a flashlight 321. Components identical to those shown in FIG. 29 are assigned the same symbols. The description will be omitted.

In FIG. 32, 351 is a reflector for reflecting a flash originating from a flash tube 331 forward. 352 is a light distribution lens for distributing the light of the flash over radiation domains of a field. 353 denotes a protective glass plate for protecting a flashlight 321. 354 and 358 are deflectors for deflecting a flash. 355 denotes a transparent ceramic PLZT plate. The deflectors 354 and 358, and the transparent ceramic PLZT plate 355 make up a radiation light amount control port 338.

A radiation light amount control port 338 is located forward of a flash tube 337, and controls the amounts of projection light of a flash originating from the flash tube 337 for projection domains corresponding to radiation domains of a field.

The radiation domains or projection domains are formed by dividing a transparent ceramic PLZT plate 355 into 64 independently-controllable domains 355(1, 1) to 355(8, 8). Assume that a projection domain corresponding to a rightmost radiation domain on the bottom of a field is 355(1, 1), and a projection domain corresponding to a leftmost radiation domain on the top is 355(8, 8), a projection domain corresponding to a radiation domain at any position is represented as 355(m, n). Herein, m denotes a lateral position of a projection domain, and n, a vertical position of the projection domain.

A pattern of 64 divided projection domains of the transparent ceramic PLZT plate 355 is designed to be the same as that of photometry domains of a light adjustment light receiving element 323 shown in FIG. 30.

Figure 34:
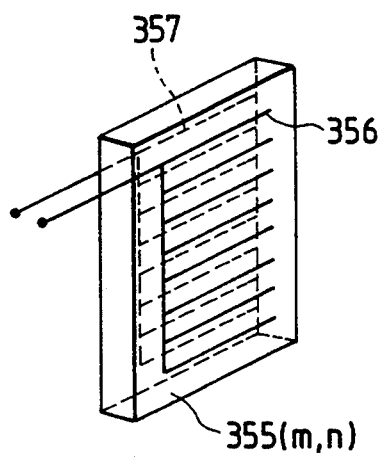
FIG. 34 is a perspective view showing a projection domain of a transparent ceramic PLZT plate.

FIG. 34 is a perspective view of a projection domain 355(m, n) of a transparent ceramic PLZT plate 355. Transparent electrodes 356 and 357 are installed on both sides of the PLZT plate 355(m, n). When voltage is supplied between the transparent electrodes 356 and 357, the transmittance T(m, n) of the PLZT plate 355 varies with the voltage value.

The above description also applies to the PLZT plates 355 of other projection domains. Therefore, the description of other projection domains will be omitted.

Figure 35:
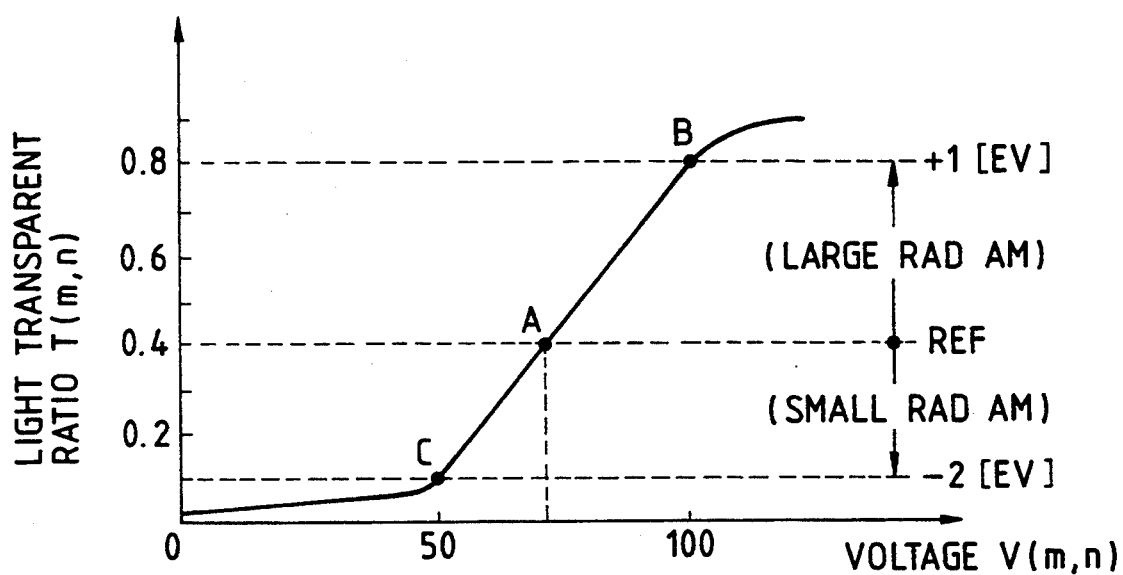
FIG. 35 shows the relationship between the voltage applied between electrodes of a projection light control port and the light transmittance.

FIG. 35 shows the relationship between the voltage supplied between the electrodes of a radiation light amount control port 338 or an instruction voltage V(m, n) for instructing an amount of projection light and the light transmittance T(m, n).

In this embodiment, a range BC of a function of FIG. 35 that represents an almost linear characteristic is adopted with a point A as a reference point.

Figure 36:
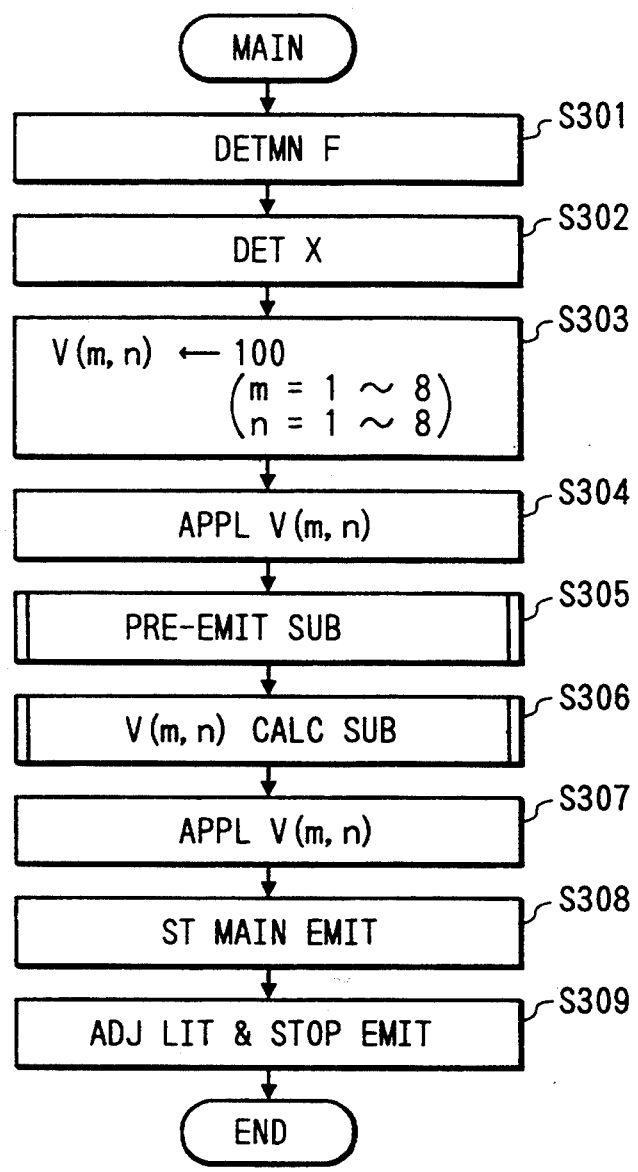
FIG. 36 is a flowchart showing the operations of a main program of a microcomputer.

FIG. 36 is a flowchart showing the operations of a main program a CPU 335 executes. The operations of an embodiment will be described according to the flowchart.

When a shutter release button is pressed halfway and fully, a CPU 335 starts executing the main program. At a step S301 after the main program starts up, a f-number F is read. The f-number F is set automatically according to a well-known flowchart in automatic exposure mode, while the f-number F is set to any value by a photographer in manual exposure mode. At a step S302, an absolute distance encoder installed in photographic lens 312, which is not shown, detects a photographic distance X from a main subject.

At a step S303, 100 is specified in projection light amount instruction voltage V(m, n) for preemission.

$$V(m, n) = 100 (m=1 \text{ to } 8, n=1 \text{ to } 8)$$

Thereby, as shown in FIG. 35, the light transmittances T(m, n) of a radiation light amount control port 338 increase to nearly a maximum, 0.8. This improves preemission efficiency.

Next, at a step S304, a radiation light amount control circuit 339 supplies the specified projection light amount instruction voltages V(m, n) for pre-emission between transparent electrodes 356 and 357 of the radiation light amount control port 338, and thus sets light transmittances T(m, n) for preemission.

Figure 37:
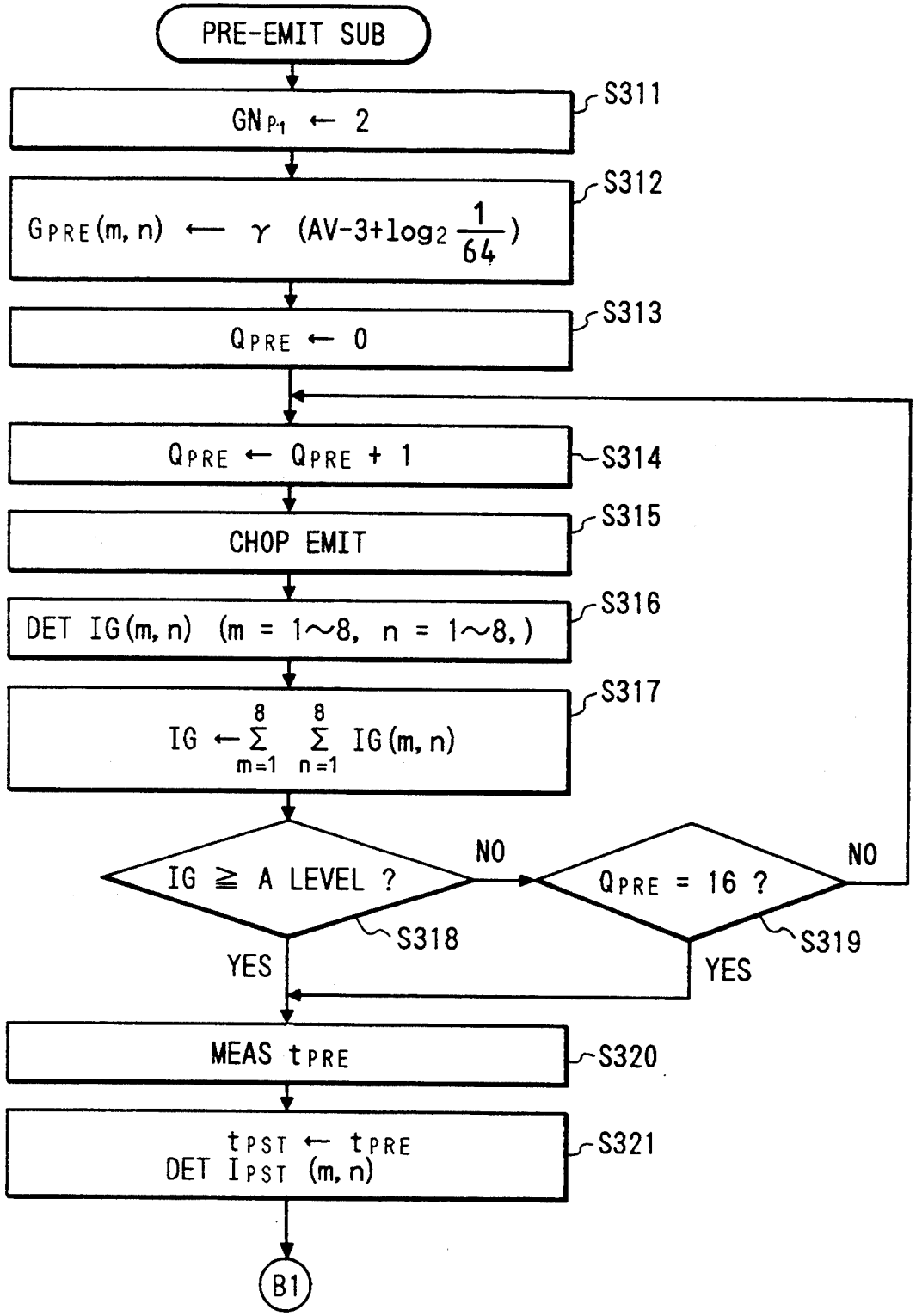
FIG. 37 is a flowchart showing the operations of a subroutine for performing pre-emission and divided photometry of reflected light.
Figure 38:
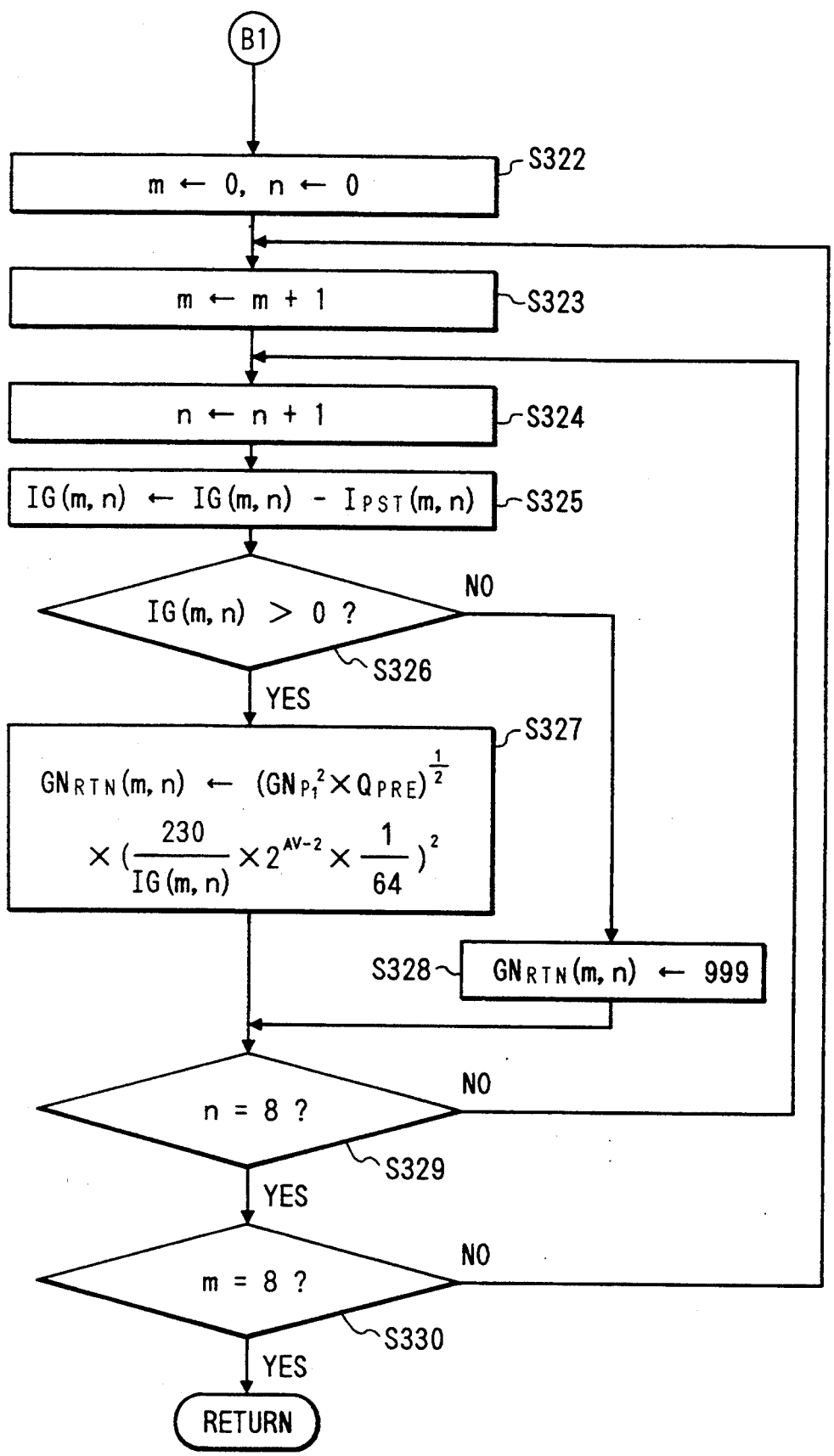
FIG. 38 is a flowchart showing the operations of a subroutine for performing pre-emission and divided photometry of reflected light.

At a step S305, a subroutine for pre-emission and for divided photometry of metering reflected light shown in FIGS. 37 and 38 is executed. Thereby, a flashlight 321 performs pre-emission and a light adjustment light receiving element 323 meters light reflected from a field in divided domains.

At a step S306, a subroutine for calculating projection light amount instruction voltages for main emission are executed. Thereby, projection light amount instruction voltages V(m, n) for main emission are calculated using the results of photometry during preemission.

At a step S307, the radiation light amount control circuit 339 supplies the projection light amount instruction voltages V(m, n) for main emission between the transparent electrodes 356 and 357 of the radiation light amount control port 338, and thus sets light transmittances T(m, n) for main emission.

At a step S308, a flashlight 321 starts main emission. At a step S309, as described above, a light adjustment circuit 333 is controlled so that light adjustment will be performed on all divided photometry domains of a light adjustment light receiving element 323. When a predetermined light adjustment level is attained, the flashlight 321 stops main emission.

Herein, light adjustment may be done only in the central domain 323(4, 4) of the light adjustment light receiving element 323.

Next, a subroutine shown in FIGS. 37 and 38 will be discussed to explain operations of preemission and divided photometry of metering reflected light.

At a step S311, 2 is a specified as a guide number $GN_p1$ per one pre-emission cycle. In this embodiment, chop emission specified with a guide number 2 is performed multiple times during pre-emission.

At a step S312, gains $G_{PRE}(m, n)$ to be specified in gain setters 342(1, 1) to 342(8, 8) of a light adjustment circuit 333 are calculated according to the following expression:

$$G_{PRE}(m, n) = \gamma(AV - 3 + \log_2(1/64))$$

where, m ranges from 1 to 8, and n, 1 to 8. $\gamma$ denotes a constant, and AV, an apex value of an f-number for pre-emission.

At a step S313, a chop emission frequency $Q_{PRE}$ is reset. At a step S314, the $Q_{PRE}$ is incremented.

At a step S315, one cycle of chop emission is performed with a guide number $GN_p1$ (=2). At a step S316, photometry is performed to meter the emitted light. A flash resulting from chop emission is reflected from a field. The reflected light passes through a photographic lens 312 and forms a primary image on the curtain of a shutter 320. The primary image is projected on a light adjustment light receiving element 323 by a condenser lens 322, and received in 64 divided metering domains 323(1, 1) to 323(8, 8). The light adjustment light receiving element 323 provides amplifiers 341(1, 1) to 341(8, 8) of a light adjustment circuit 333 with photometric signals whose levels are associated with the amounts of light received in the divided metering domains 323(1, 1) to 323(8, 8).

The amplifiers 341(1, 1) to 341(8, 8) amplify the photometric signals by gains PRE(m, n) specified in gain setters 342(1, 1) to 342(8, 8), then supply the amplified signals to integrating circuits 343(1, 1) to 343(8, 8). In this stage, a CPU 335 outputs activation signals to the integrating circuits 343(1, 1) to 343(8, 8). In response to these activation signals, the integrating circuits 343(1, 1) to 343(8, 8) integrate the amplified signals at regular intervals, then provide the CPU 335 with outputs IG(m, n) (m=1 to 8, n=1 to 8).

Next, at a step S317, a sum total IG of data values of 64 photometric signals IG(m, n) ) is calculated as follows:

$$IG = \Sigma\Sigma(IG(m, n))$$

where, $\Sigma\Sigma$ represents summation in the ranges of m=1 to 8 and n=1 to 8.

At a step S318, it is determined whether the IG reaches a predetermined light adjustment level. If the IG has reached the predetermined level, control passes to a step S320. If it has not reached, control passes to a step S319. At the step S319, it is determined that 16 is specified in chop emission frequency $Q$PRE. If 16 is specified, control passes to a step S320. If 16 is not specified, control returns to a step S314.

When the sum total IG of photometric signal data has reached the predetermined light adjustment level or when 16 cycles of chop emission has completed, the total photometry time $tpR_E$ required for metering pre-emission light is measured.

At a step S321, the same optical systems used for metering pre-emission light are used to meter stationary light. The stationary light photometry time $t_{pST}$ is set to the same value as the total photometry time for pre-emission $t_{pRE}$. Metered values of stationary light are represented as $I_{pST}(m, n)$.

Next, at steps S322 to S330 in FIG. 38, 64 photometric outputs of m and n ranging from 1 to 8 respectively are compensated for stationary light components, and values $GN_{RTN}(m, n)$ are calculated.

At a step S322, parameters m and n indicating divided metering domains are cleared. At a step S323, m is incremented. At a step S324, n is incremented. At a step S325, a stationary component $I_{PST}(m, n)$ is subtracted from a value IG (m, n) containing pre-emission and stationary light components. Then, the subtracted value is compensated for the stationary component to produce photometric signal data IG(m, n). At a step S326, it is determined whether the compensated IG(m, n) value is positive. If it is positive, control passes to a step S327. If the value is not positive, control passes to a step S328.

At the step S327, a value GNRTN(m, n) is calculated according to the following expression:

$$GN_{RTN}(m, n) = (GN_p1^2 \times Q_{PRE})^{\frac{1}{2}} \times (230/IG(m, n) \times 2^{AV-2} \times (1/64))^{\frac{1}{2}}$$

According to the above expression, when a subject in a domain has a standard reflectance, the $GN_{RTN}(m, n)$ value for the domain is provided as a product of an f-number F by a photographic distance X. In other words, a domain represented as $F \times X = GN_{RTN}(m, n)$ is thought to contain a subject having a standard reflectance at a position of a photographic distance X. In a domain represented as $F \times X > GN_{RTN}(m, n)$, an object having a higher reflectance than the standard reflectance resides at a position of a photographic distance X. In a domain represented as $F \times X < GN_{RTN}(m, n)$, an object having a lower reflectance than the standard reflectance resides at a position of a photographic distance X. That is to say, the higher reflectance an object has, the smaller value $GN_{RTN}(m, n)$ takes on.

On the other hand, at a step S328, a very large value or an almost infinite value (here, for example, 999) is set in $GNT_{RTN}(m, n)$. Then, control passes to a step S329. At the steps S329 and 330, it is determined whether the aforesaid processing has performed on all of 64 divided photometry domains of (m=1 to 8, n=1 to 8). The processing is repeated until all the 64 domains have been handled.

Next, a subroutine shown in FIGS. 39 to 42 will be discussed to explain an operation of calculating projection light amount instruction voltages for main emission.

Prior to describing the processing, the outline will be given in conjunction with FIGS. 43 to 48B.

Figure 43:
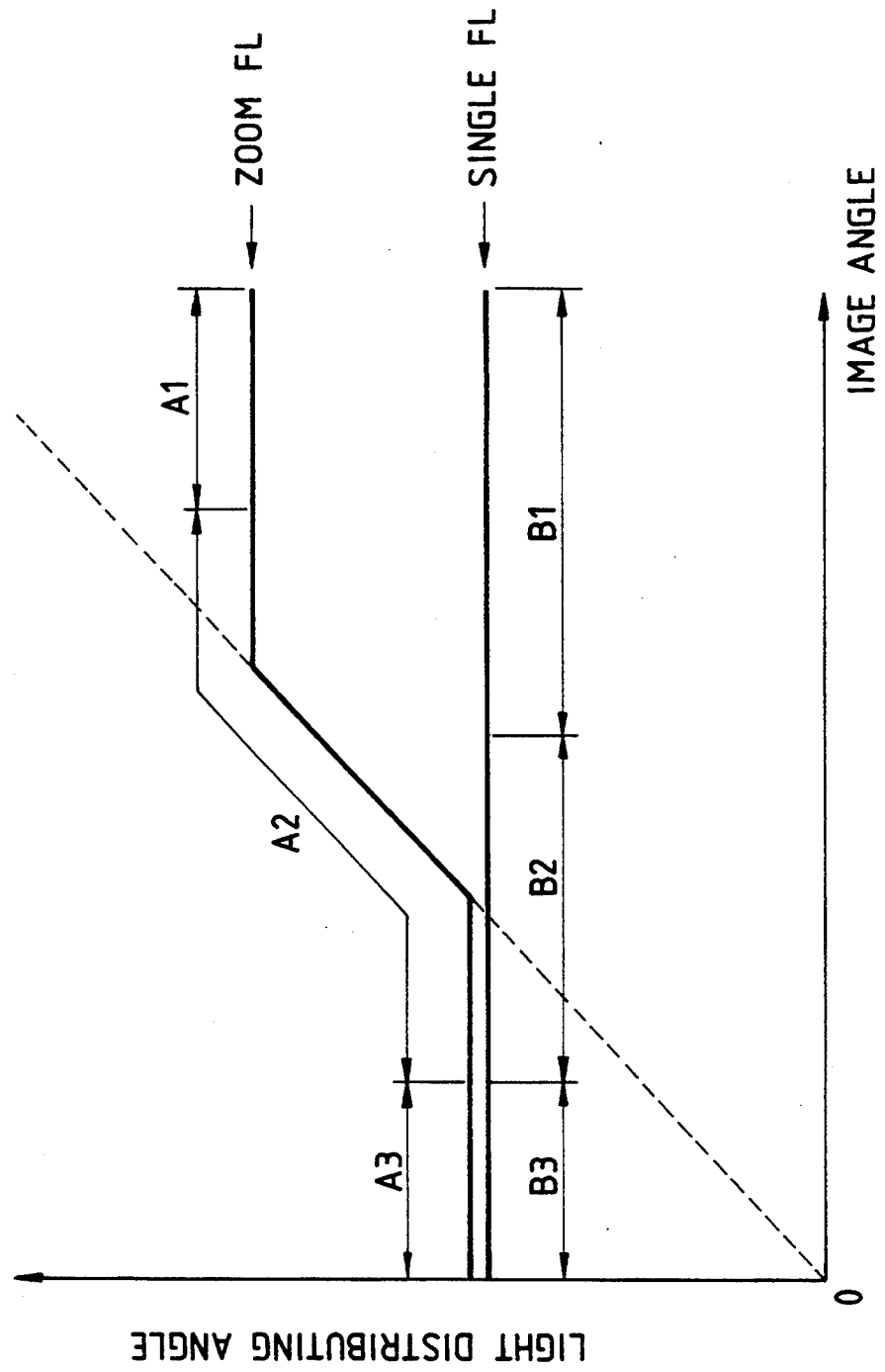
FIG. 43 shows the relationship between the angle of view of a photographic lens and the light distribution angle of a flashlight.

FIG. 43 shows the relationship between the angle of view of a photographic lens 312 and the light distribution angle of a flashlight 321.

In a flashlight 321 having a light distribution varying device 340 (hereafter, zoom flashlight), the relationship between the angle of view of a photographic lens 312 and the light distribution angle of a flashlight 321 shows three different characteristics represented as ranges A1, A2, and A3 in FIG. 43.

(Range A1) The angle of view of a photographic lens 312 (corresponding to focal distance fL) is so large the distribution angle of a flashlight 321 cannot follow the angle of view perfectly. In this embodiment, the angle of view of the photographic lens 312 corresponds to a focal distance fL of less than 28 mm. In this case, the distribution angle of the flashlight 21 is fixed to a focal distance fSB of 28 mm.

(Range A2) A light distribution angle varying device 340 is used to vary the light distribution angle of the flashlight 321 depending on the angle of view of the photographic lens 312. In this embodiment, the light distribution angle of the flashlight 321 corresponds to a focal distance fL of 28 to 70 mm. At this time, the light distribution angle of the flashlight 321 is set to a value equivalent to a focal distance fSB of 28 to 70 mm and to a focal distance fL of the photographic lens 312.

(Range A3) The angle of view of the photographic lens 312 is so small that the distribution angle of the flashlight 321 cannot follow the angle of view perfectly. In this embodiment, the angle of view of the photographic lens 312 corresponds to a focal distance fL of more than 70 mm. At this time, the light distribution angle of the flashlight 321 is fixed to a focal distance fSB of 70 mm.

In the range A2, the photometry range of a light adjustment light receiving element 323 during pre-emission is identical to the radiation range of the flashlight 321 for photography. The amounts of projection light for projection domains for photography can be specified using the outputs of corresponding divided photometry domains during preemission as they are.

However, in the ranges A1 and A3, the photometry range during pre-emission differs from the radiation range for photography. The amounts of projection light for projection domains for photography cannot be specified using the outputs of corresponding divided photometry domains during preemission as they are.

The above discussion also applies to a flashlight not having a light distribution angle varying device (hereafter, a single flashlight).

In a range B2, the photometry range during preemission can be regarded as almost identical to the radiation range for photography. The amounts of projection light for projection domains for photography can be determined using the outputs of corresponding divided metering domains during pre-emission as they are.

However, in ranges B1 and B3, the photometry range during pre-emission differs from the radiation range for photography. The amounts of projection light for projection domains for photography cannot be determined using the outputs of corresponding divided photometric domains during pre-emission as they are.

Hereafter, the drawbacks of a zoom flashlight in the states represented as ranges A1 and A3 will be resolved. When the aforesaid problems of the zoom flashlight are solved, the problems of a single flashlight in the states represented as ranges B1 and B3 can be solved duly. The solutions for the single flashlight will, therefore, not be discussed.

FIGS. 44A to 48B shows the relationships between:
(1) the photometry range PMR and radiation range RDR during pre-emission photometry, and
(2) the photographic range POR and radiation range RDR during photography. Herein, the ratio $\beta$ (=fL/fSB) of the focal distance fL corresponding to the angle of view of a photographic lens 312 to the focal distance fSB corresponding to the light distribution angle of a flashlight 321 varies.

Figure 44A:
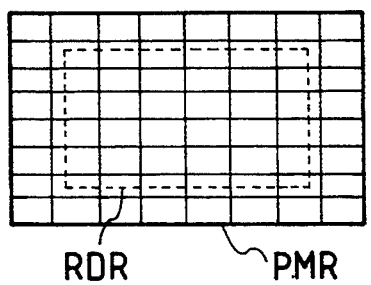
FIGS. 44A and 44B show the relationships between the flash radiation range, photometry range, and photographic range during pre-emission photometry and photography.
Figure 44B:
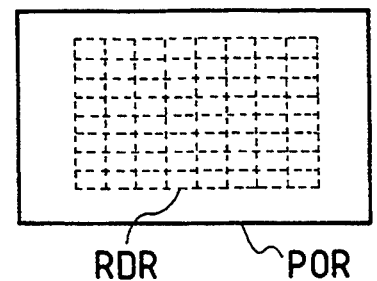

First, FIGS. 44A and 44B show the relationships under the condition of $\beta < 24/28$, or in this embodiment, $\beta = 18/28$ that belongs to a range A1 of FIG. 43.

In pre-emission photometry, as shown in FIG. 44A, the radiation range RDR is smaller than the photometry range PMR. Therefore, the amounts of projection light for projection domains for photography (FIG. 44B) cannot be determined using the outputs of corresponding divided photometry domains during preemission as they are. To determine the amounts of projection light for projection domains for photometry, the relationships between the divided photometry domains and projection domains must be clarified numerically.

Next, under the condition of $24/28 < \beta < 28/28$ that indicates a point near the leftmost in a range A1 of FIG. 43, the radiation range is smaller than the photometry range. The difference is very small. Therefore, similarly to under $28/28 = \beta = 70/70$, the outputs of divided photometry domains during pre-emission are used as they are.

Figure 45A:
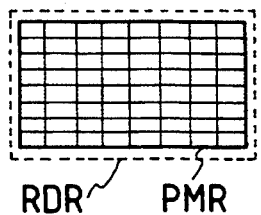
FIGS. 45A and 45B show the relationships between the flash radiation range, photometry range, and photographic range during pre-emission photometry and photography.
Figure 45B:
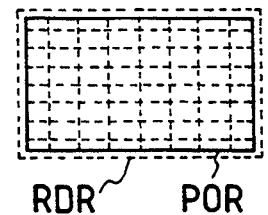

FIGS. 45A and 45B show the relationships among the photometry, radiation, and photography ranges under the condition of $28/28 = \beta = 70/70$ that belongs to a range A2 of FIG. 43. In pre-emission photometry, as shown in FIG. 45A, the photometry range PMR equals to the radiation range RDR. Therefore, the amounts of projection light for projection domains for photography (FIG. 45B) are determined using the outputs of corresponding divided photometry domains during pre-emission as they are.

Under the condition $70/70 < \beta < 80/70$ that indicates a point near the rightmost of a range A3, the radiation range is larger than the photometry range as shown in FIGS. 45A and 45B. However, the difference is very small. Therefore, similarly to under $28/28 < \beta < 70/70$, the outputs of corresponding divided photometry domains during pre-emission can be used as they are.

Figure 46A:
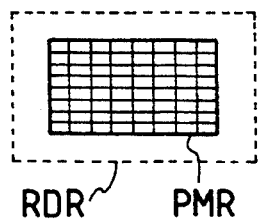
FIGS. 46A and 46B show the relationships between the flash radiation range, photometry range, and photographic range during pre-emission photometry and photography.
Figure 46B:
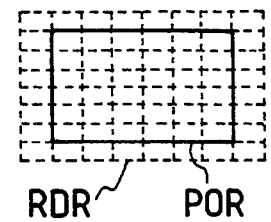

FIGS. 46A and 46B show the relationships among the photometry, radiation, and photography ranges under the condition of $80/70 = \beta = 112/70$ that belongs to a range A3 of FIG. 43. In pre-emission photometry, as shown in FIG. 46A, the radiation range RDR is larger than the photometry range PMR. Therefore, the amounts of projection light for projection domains for photography (FIG. 46B) cannot be determined using the outputs of corresponding divided photometry domains during pre-emission as they are. Then, to determine the amounts of projection light for the projection domains for photography, the relationships between the divided photometry domains and projection domains must be numerically clarified, and the amounts of projection light for peripheral domains in which no data results from photometry must be determined.

Figure 47A:
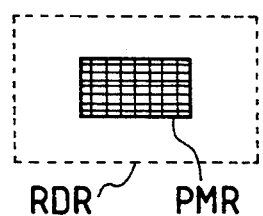
FIGS. 47A and 47B show the relationships between the flash radiation range, photometry range, and photographic range during pre-emission photometry and photography.
Figure 47B:
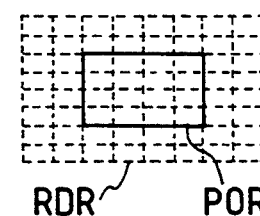

FIGS. 47A and 47B show the relationships among the photometry, radiation, and photography ranges under the conditions of $112/70 = \beta = 187/70$ and, in this embodiment, $\beta = 140/70$ that belongs to the range A3 of FIG. 43.

In pre-emission photometry, as shown in FIG. 47A, the radiation range RDR is larger than the photometry range PMR. Therefore, the amounts of projection light for projection domains for photography (FIG. 47B) cannot be determined using the outputs of corresponding divided photometry domains during preemission as they are. To determine the amounts of projection light for the projection domains for photography, the relationships between the divided photometry domains and projection domains must be clarified numerically and the amounts of projection light for peripheral domains in which no data results from photography must be determined.

Figure 48A:
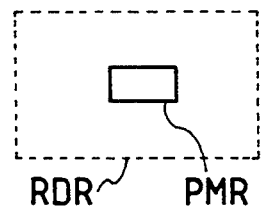
FIGS. 48A and 48B show the relationships between the flash radiation range, photometry range, and photographic range during pre-emission photometry and photography.
Figure 48B:
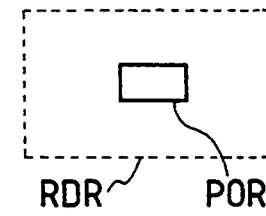

FIGS. 48A and 48B show the relationships among the photometry, radiation, and photography ranges under the conditions of $187/70 < \beta$ and, in this embodiment, $\beta = 300/70$ that belongs to the range A3 of FIG. 43.

In pre-emission photometry, as shown in FIG. 48A, the radiation range RDR is much larger than the photometry range PMR. Therefore, the amounts of projection light for corresponding projection domains cannot be determined using the results of photometry for divided photometry domains. Then, predetermined values are set as the amounts of projection light for the projection domains.

Based on the above discussion, calculating projection light amount instruction voltages for main emission will be described according to the flowcharts of FIGS. 39 to 42.

At a step S341, a focal distance fL is read from a photographic lens 312. When a zoom lens is used, a focal distance a photographer has set is read. At a step S342, a light distribution varying device 340 of a flashlight 321 sets the light distribution angle of the flashlight 321 according to the focal distance fL of the photographic lens 312 using the graph of FIG. 43.

At a step S343, the ratio $\beta$ ($= fL/fSB$) of the focal distance fL of the photographic lens 312 to the focal distance fSB associated with a light distribution angle is calculated. At a step S344, it is determined whether $\beta$ is a quotient of 187/70. If $\beta$ is the quotient, control passes to S345. If $\beta$ is not the quotient, control passes to a step S366 of FIG. 42.

Figure 42:
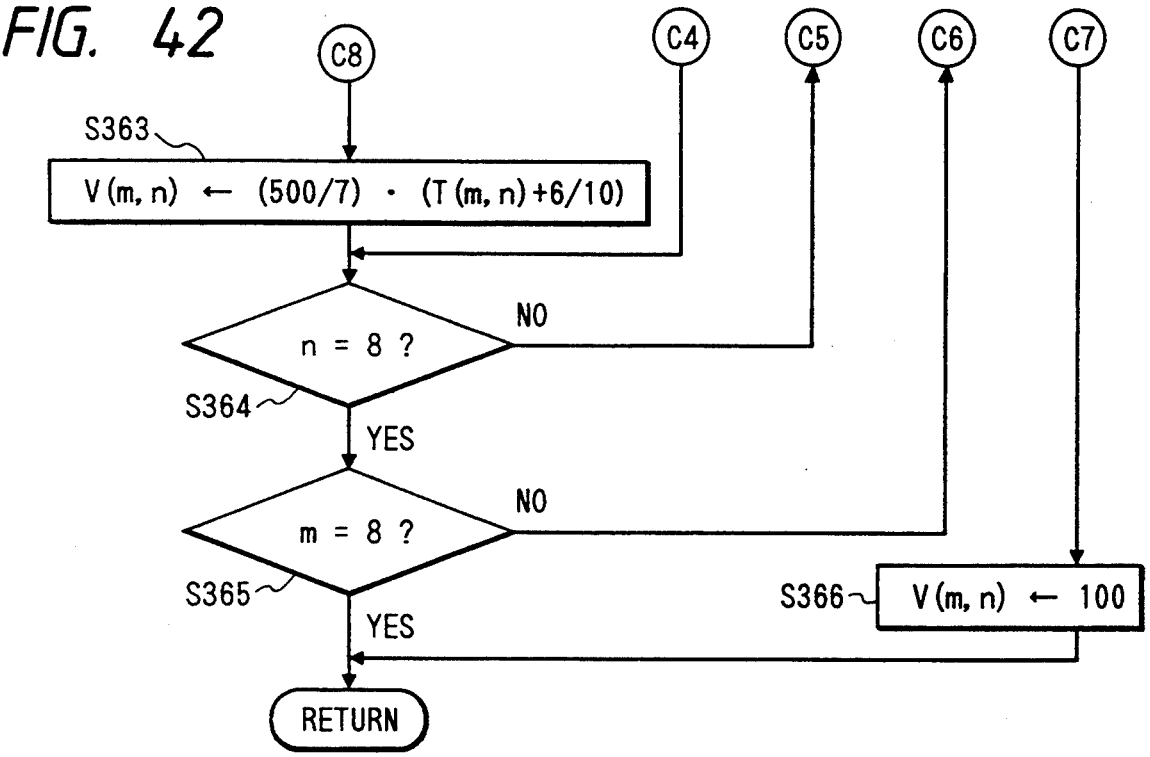
FIG. 42 is a flowchart showing the operations of a subroutine for calculating a projection light instruction voltage for main emission.

When the focal distance fL of the photographic lens 312 is large, 100 is set in projection light amount instruction voltage V(m, n) at a step S366 of FIG. 42. Then, control returns to the main program.

Figure 39:
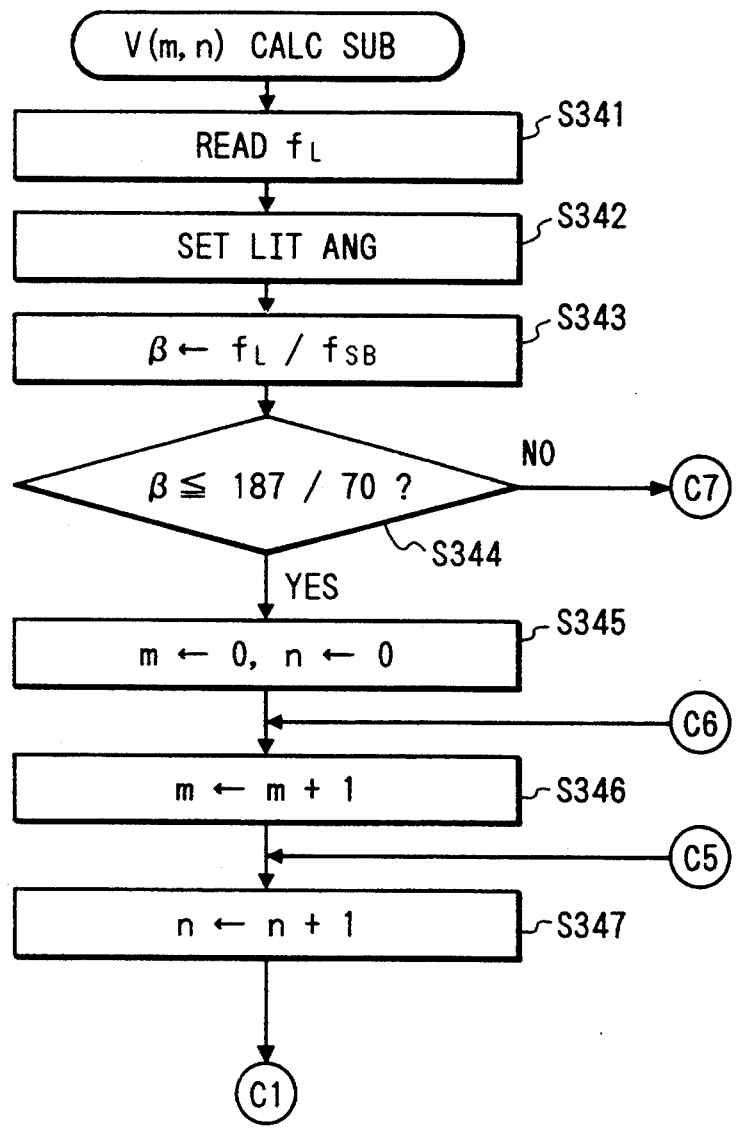
FIG. 39 is a flowchart showing the operations of a subroutine for calculating a projection light instruction voltage for main emission.

If it is determined at the step S344 of FIG. 39 that is smaller than a quotient of 187/70, projection light amount instruction voltages V(m, n), in which m or n ranges from 1 to 8, for 64 projection domains are calculated.

First, at a step S345, m and n are cleared. At a step S346, m is incremented. At a step S347, n is incremented. Then, control passes to a step S348 of FIG. 40.

Figure 40:
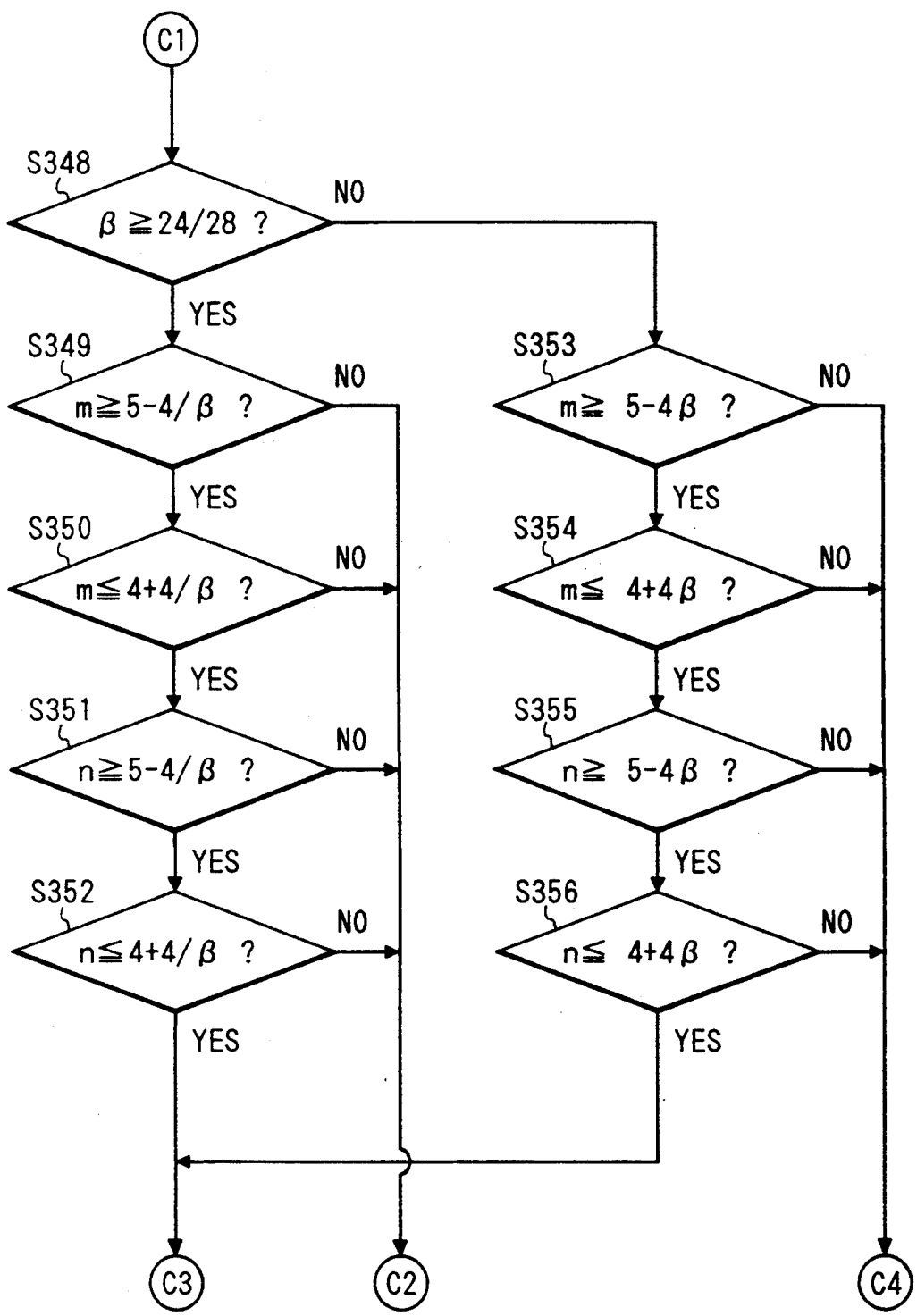
FIG. 40 is a flowchart showing the operations of a subroutine for calculating a projection light instruction voltage for main emission.

At the S348 of FIG. 40, it is determined whether $\beta$ exceeds a quotient of 24/28. It $\beta$ exceeds the quotient, control passes to a step S349. It $\beta$ does not exceed the quotient, control passes to a step S353.

When the focal distance of the photographic lens 312 is small, domains that meet the conditions below are extracted at steps S353 to S356.

$(5-4\beta) \leq m \leq (4+4\beta)$ and $(5-4\beta) \leq n \leq$ $(4+4\beta)$

Figure 41:
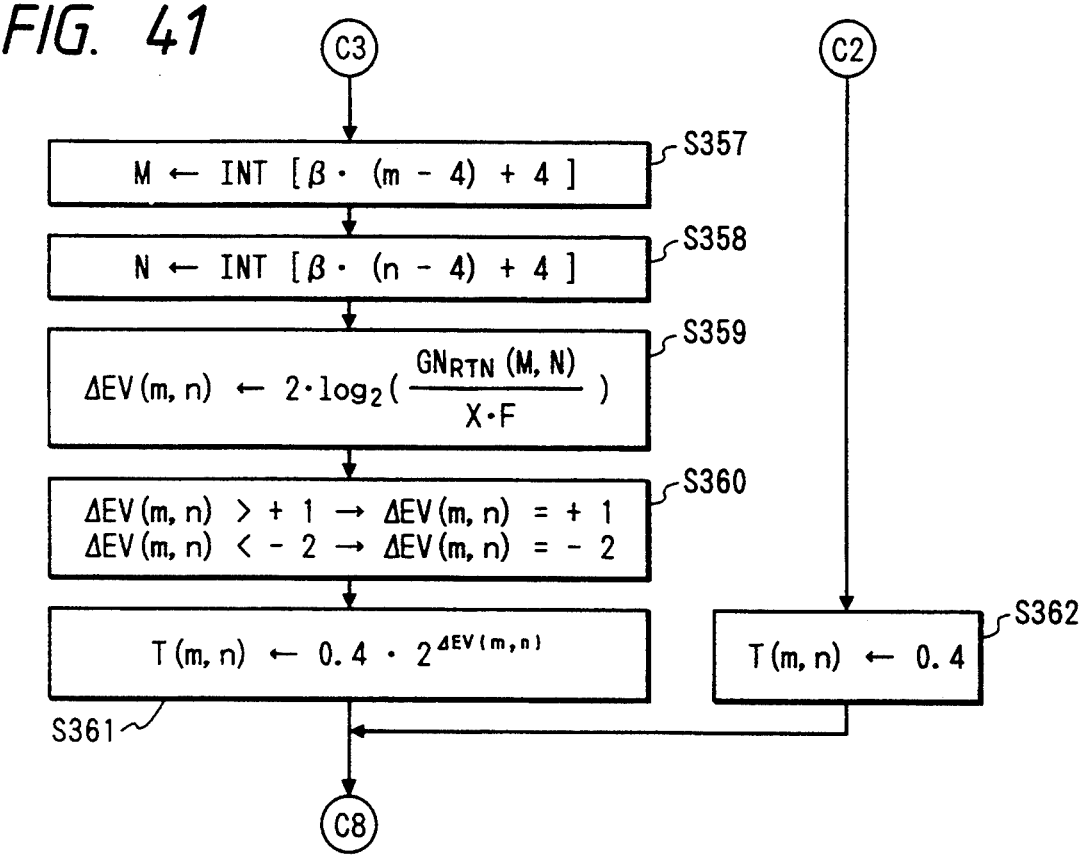
FIG. 41 is a flowchart showing the operations of a subroutine for calculating a projection light instruction voltage for main emission.

Then, control passes to a step S357 of FIG. 41.

When a negative response is returned at any of the steps S353 to 356, if the domain does not meet the above conditions, control passes to a step S364 of FIG. 42.

When it is determined that B exceeds a quotient of 24/28 at the step S348, domains that meet the conditions below are extracted at the steps S349 to S352.

$(5-b/\beta) \leq m \leq (4+(4/\beta))$, and $(5-4/\beta) \leq n \leq (4+4/\beta)$ Then, control passes to a step S357 of FIG. 41.

When a negative response is returned at any of the steps S349 to S352, if the domain does not meet the above conditions, control passes to a step S362 of FIG. 41. 0.4 is set in light transmittance T(m, n) according to the expression below. Then, control passes to a step S363 of FIG. 42.

At the step S357, M is calculated according to the following expression:

$M = INT[\beta \times (m-4)+4]$ where, INT [] means that the resultant value of [] will be rounded off to be an integer. At a step S358, N is given by:

$$N = INT[\beta \times (n-4) + 4]$$

At a step S359, quantities of radiation to be corrected (or radiation correction) $\Delta EV(m, n)$ are calculated using photographic distances X and $GN_{RTN}(M, N)$ values that are obtained when focusing is attained:

$$\Delta EV(m, n) = 2 \times \log_2(GN_{RTN}(M, N)/(X \times F))$$

At the step S360, the quantities of radiation correction are limited by executing Limit. This is because an extremely large quantity of correction may cause irregular light distribution. Then, when a $\Delta EV(m, n)$ value is larger than $+1$, $\Delta EV(m, n) = +1$ is specified. When a $\Delta EV(m, n)$ value is smaller than $-2$ $\Delta EV(m, n) = -2$ is specified. The absolute value differs between the signs, intending to prevent the closest values from causing over-exposure.

At the step S361, light transmittances for projection domains of a radiation light amount control port 338 are calculated using the $\Delta EV(m, n)$ values.

$$T(m, n) = 0.4 \times 2^Z$$

where $Z = \Delta EV(m, n)$.

Next, at a step S363 of FIG. 42, projection light amount instruction voltages $V(m, n)$ for the projection domains are calculated using the $T(m, n)$ values.

$$V(m, n) = (500/7) \times (T(m, n) + 6/10)$$

When the above processing has thus performed on all the projection domains, control returns to the main program.

As described previously, a single flash tube is used, and an amount of projection light originating from the flash tube is controlled differently among radiation domains of a field, then radiated. This realizes a compact and lightweight design, reduces required energy, and eventually minimizes heat dissipation during continuous operation. Furthermore, overlapping or missing radiation does not occur on the borders of the radiation domains. This prevents irregular light distribution. Moreover, since only one light adjustment circuit is required, simple control circuitry is realized.

In this embodiment, the amounts of projection light for projection domains corresponding to multiple radiation domains of a field are calculated using the results of pre-emission photometry, the angle of view of a photographic lens, and the light distribution angle of a flashlight. Therefore, even if the angle of view of the photographic lens differs from the light distribution angle of the flashlight, the light distribution of a flash can be controlled reliably according to the spatial distribution of subjects. Thus, the multiple subjects located at different photographic distances can be exposed optimally.

When the light distribution angle of the flashlight is smaller than the angle of view of the photographic lens, the amounts of projection light for the projection domains are calculated using the results of photometry for divided photometry domains within the distribution angle of the flashlight. When the distribution angle of the flashlight is larger than the angle of view of the photographic lens, the amounts of projection light are calculated using the results of photometry for divided photometry domains within the angle of view of the photographic lens. When the distribution angle of the flashlight is larger than the angle of view of the photo- graphic lens and the difference exceeds a predetermined value, the amounts of projection light are set to predetermined values. Thus, even if the angle of view of the photographic lens differs from the light distribution angle of the flashlight, the light distribution of a flash can be controlled reliably according to the spatial distribution of subjects. Thus, the multiple subjects located at different photographic distances can be exposed optimally.

In the aforesaid embodiment, a radiation light amount control member is made of transparent ceramic PLZT. A liquid crystal or electro-chromic display (ECD) may also be employed.

The number and shapes of divided radiation domains of a field or corresponding projection domains of a flashlight are not limited to those in the aforesaid embodiment. The number and shapes of divided photometry domains are not restricted to those in the aforesaid embodiment, either. The relationships between the projection domains of a flashlight and the divided photometry domains of a photometer are not confined to those in the aforesaid embodiment.

In the configuration of the aforesaid embodiment, a flashlight 321 serves as a flashing means (divided radiation type flashlight), and a flash tube 337, as a light emission port. A radiation light amount control port 318 and a radiation light amount control circuit 339 form a light amount control port. An exposure control light receiving element 318 and a photometry circuit 332 form a divided photometry means. A microcomputer (CPU) 335 serves as a light amount calculating means.

As described previously, according to the present invention, a single light emission port is used, and the amount of light from the light emission port is controlled differently among radiation domains of a field. This provides the following advantages:

(1) a whole flashlight is designed to be compact and lightweight;

(2) required energy is reduced and heat dissipation during continuous operation is minimized;

(3) overlapping or missing radiation does not occur on borders of divided domains, unlike conventional flashlights, thus preventing irregular light distribution; and (4) only one light adjustment circuit is required, thus realizing simple control circuitry.

In the present invention, the amounts of projection light for projection domains corresponding to multiple radiation domains of a field are calculated using the results of pre-emission photometry, the angle of view of a photographic lens, and the light distribution angle of a flashing means. Therefore, even if the angle of view of the photographic lens differs from the light distribution angle of the flashing means, the light distribution of a flash can be controlled reliably according to the spatial distribution of subjects. Thus, the multiple subjects located at different photographic distances can be exposed optimally.

When the light distribution angle of a flashing means is smaller than the angle of view of a photographic lens, the amounts of projection light for projection domains are calculated using the results of photometry by a divided photometry means within the light distribution angle of the flashing means. When the distribution angle of a flashing means is larger than the angle of view of a photographic lens, the amounts of projection light are calculated using the results of photometry by a divided photometry means within the angle of view of the photographic lens. When the light distribution angle of a flashing means is larger than the angle of view of a photographic lens and the difference exceeds a predetermined value, the amounts of projection light are set to predetermined values. Thus, even when the angle of view of a photographic lens differs from the light distribution angle of a flashing means, the light distribution of a flash can be controlled reliably according to the spatial distribution of subjects, That is, the multiple subjects located at different photographic distances can be exposed optimally.

What is claimed is:

1. A divided radiation type flashlight system, comprising:
   a single flashtube;
   a determining circuit to determine distances from multiple distance measuring domains of a field and calculate quantities of weighting the amounts of radiation light originating only from said single flashtube for light radiation domains of said field using distance measurement information of said multiple distance measuring domains; and
   a weighting device to weight radiation light originating only from said single flashtube for said light radiation domains according to said provided quantities of weight.

2. A divided radiation type flashlight system according to claim 1 wherein said determining circuit determines distances based on focus detection.

3. A divided radiation type flashlight system according to claim 1 wherein said determining circuit outputs a value smaller than a predetermined limit value instead of any one of said calculated quantities of weighting when the absolute value of said one exceeds the predetermined limit value.

4. A divided radiation type flashlight system according to claim 1 wherein there is a predetermined first limit value for increasing any of said quantities of radiation light with respect to a reference quantity of radiation light and a predetermined second limit value for decreasing any of said quantities of radiation light with respect to the reference quantity of radiation light, said first and second limit values having different absolute values.

5. A divided radiation type flashlight system according to claim 1 wherein said weighting device is made of transparent ceramic.

6. A camera capable of loading a flashlight apparatus having a single flashtube for emitting radiation light to a field, comprising:
   a determining circuit to determine distances from multiple distance measuring domains of a field and calculate quantities of weighting the amounts of radiation light originating only from said single flashtube for light radiation domains of said field using distance measurement information of said multiple distance measuring domains; and
   a control circuit to control said flashlight apparatus so that radiation light originating only from said single flashtube will be weighted differently among said light radiation domains according to said quantities of weight.

7. A camera according to claim 6 wherein said determining circuit determines distances based on focus detection.

8. A camera according to claim 6 wherein said determining circuit outputs a value smaller than a predetermined limit value instead of any one of said calculated quantities of weight when the absolute value of said one exceeds the predetermined limit value.

9. A camera according to claim 6, wherein there is a predetermined first limit value for increasing any of said quantities of radiation light with respect to a reference quantity of radiation light and a predetermined second limit value for decreasing any of said quantities of radiation light with respect to said reference quantity of radiation light, said first and second limit values having different absolute values.

10. A camera according to claim 6, wherein said weighting is performed by a device made of transparent ceramic.

11. A divided radiation type flashlight apparatus capable of being attached to a camera for determining distances from multiple domains of a field, comprising:
    a single flashtube; and
    a weighting device to weight radiation light originating only from said single flashtube for multiple radiation domains of the field based on determined outputs provided by determining distances from said multiple distance determining domains of the field.

12. A divided radiation type flashlight according to claim 11 wherein said weighting device is made of transparent ceramic.

13. A divided radiation type flashlight system, comprising:
    a flashing apparatus including a single flashtube and a light amount control device having multiple projection domains disposed in front of said single flashtube, said light amount control device controlling the amounts of light originating from said multiple projection domains corresponding to multiple radiation domains of a field, to be photographed, said flashing apparatus performing preemission and main emission;
    a divided photometry circuit to meter luminous flux from each of multiple divided domains in said field; and
    a control circuit to calculate quantities of weight for main emission for said multiple projection domains based on the results of photometry by said divided photometry circuit during pre-emission of said flashing apparatus and to control the quantities of projection light for said multiple projection domains based on the calculated quantities of weight.

14. A divided radiation type flashlight system according to claim 13 wherein the pattern of said multiple divided photometry domains of said divided photometry circuit is the same as that of said multiple projection domains of said flashing apparatus.

15. A camera capable of loading a flashlight apparatus including a single flashtube for performing preemission and main emission, comprising:
    a divided photometry circuit to meter luminous flux from each of multiple divided domains in a field; and
    a control circuit to calculate quantities of weight for said main emission on the basis of the results of photometry by said divided photometry circuit during said pre-emission and to control said flashlight apparatus, said flashlight apparatus including a light amount control device having multiple projection domains disposed in front of said single flashtube, said light amount control device adjusting the amounts of light originating from said multiple projection domains, said light amount control device controlling said multiple projection domains based on the quantities of weight said control circuit calculates.

16. A camera according to claim 15 wherein the pattern of said multiple divided photometry domains of said divided photometry circuit is the same as that of said multiple projection domains.

17. A flashlight apparatus for performing preemission and main emission, comprising:
a single flashtube; and
a light amount control device having multiple projection domains arranged forward of said single flashtube and capable of controlling the amounts of light originating from said multiple projection domains corresponding to radiation domains of a field to be photographed;
said light amount control device inputting quantities of weight for said multiple projection domains calculated using results of photometry of metering luminous flux emitted by said single flashtube and reflected from said field during pre-emission in multiple domains, and controlling the amounts of light for said multiple projection domains for main emission according to the quantities of weight.

18. A flashlight apparatus according to claim 17 wherein a pattern of multiple divided domains for photometry during pre-emission is substantially the same as that of said multiple projection domains of said flashlight apparatus.

19. A divided radiation type flashlight system, comprising:
a flashing apparatus including a single flashtube and a light amount control device to control the amounts of radiation light originating only from said single flashtube to multiple radiation domains of a field to be photographed so as to vary the amounts of radiation light received by radiation domains of the field relative to the amounts of radiation light received by other radiation domains of the field;
a distance measuring circuit to measure distances from multiple distance measuring domains of the field;
a light amount calculating circuit to calculate the amount of radiation light for at least one of said radiation domains corresponding to a measurable part among said multiple distance measuring domains based on the distance of said measurable part, calculate the amount of radiation light for at least one of said radiation domains corresponding to an unmeasurable part among said multiple distance measuring domains based on the distance of said measurable part, and output light amount signals which cause said light amount control device to control the amounts of radiation light to said multiple radiation domains.

20. A flashlight system according to claim 19 wherein said distance measuring circuit detects state values of focal adjustment in a photographic lens, and calculates subject distances from said distance measuring domains using the results of the detection.

21. A flashlight system according to claim 19 wherein said urunmeasurable part contains a low-contrast subject.

22. A camera capable of loading a flashlight apparatus having a single flashtube for emitting radiation light to multiple radiation domains of a field, comprising:

a distance measuring circuit to measure subject distances from multiple distance measuring domains of a field;
a light amount calculating circuit to calculate the amount of radiation light for at least one of said radiation domains corresponding to a measurable part among said multiple distance measuring domains based on the distance of said measurable part, calculate the amount of radiation light for at least one of said radiation domains corresponding to an unmeasurable part among said multiple distance measuring domains based on the distance of said measurable part, and output light amount signals, said flashlight apparatus having a light amount control device responsive to said light amount signals for varying the amounts of radiation light originating only from said single flashtube to radiation domains of the field relative to the amounts of radiation light to other radiation domains of the field.

23. A camera according to claim 22 wherein said distance measuring circuit detects state values of focal adjustment state in a photographic lens, and calculates subject distances from said distance measuring domains according to the results of the detection.

24. A camera according to claim 22 wherein said unmeasurable part of said distance measuring circuit contains a low-contrast subject.

25. A flashlight apparatus capable of being attached to a camera having a measuring circuit to measure distances from multiple domains of a field, comprising:
a single flashtube; and
a light amount control device to control the amounts of radiation light originating only from said single flashtube for radiation domains of a field;
wherein said camera has a calculating circuit to calculate the amounts of radiation light for a measurable part and an unmeasurable part among said multiple domains on the basis of distance of said measurable part and output light amount signals to said light amount control device, and said light amount control device varies the amounts of radiation light received by radiation domains of the field relative to the amounts of radiation light received by other radiation domains of the field, on the basis of said light amount signals.

26. A flashlight apparatus according to claim 25 wherein said distances are calculated using the results of detecting state values of focal adjustment in a photographic lens.

27. A flashlight apparatus according to claim 25 wherein said unmeasurable part contains a low-contrast subject.

28. A divided radiation type flashlight system, comprising:
a flashing apparatus including a single flashtube and a light amount control device to control the amounts of light originating from projection domains corresponding to multiple radiation domains of a field to be photographed, and performing pre-emission and main emission;
a divided photometry circuit to meter luminous flux from multiple divided photometry domains of the field; and
a light amount calculating circuit to calculate the amounts of projection light for said projection domains based on the results of the photometry by said divided photometry circuit during pre-emission of said flashing apparatus, the angle of view of a photographic lens, and the light distribution angle of said flashing apparatus.

29. A divided radiation type flashlight system according to claim 28 wherein said light amount calculating circuit calculates the amounts of projection light for said projection domains on the basis of results of photometry said divided photometry circuit has acquired within said light distribution angle of said flashing apparatus when said light distribution angle of said flashing apparatus is smaller than said angle of view of said photographic lens.

30. A divided radiation type flashlight system according to claim 28 wherein said light amount calculating circuit calculates the amounts of projection light for said projection domains on the basis of results of photometry said divided photometry circuit has acquired within said angle of view of said photographic lens when said light distribution angle of said flashing apparatus is larger than said angle of view of said photographic lens.

31. A divided radiation type flashlight system according to claim 28 wherein said light amount calculating circuit sets predetermined values as the amounts of projection light for said projection domains when said light distribution angle of said flashing apparatus is larger than said angle of view of said photographic lens.

32. A camera capable of loading a flashlight apparatus including a single flashtube for emitting radiation light to a field to be photographed and performing pre-emission and main emission, comprising:
a divided photometry circuit to meter luminous flux multiple divided photometry domains of the field, said flashlight apparatus including a light amount control device having projection domains arranged forward of said single flashtube; and
a light amount calculating circuit to calculate the amounts of projection light for said projection domains on the basis of the results of photometry by said divided photometry circuit during pre-emission of said flashlight apparatus, the angle of view of a photographic lens, and the light distribution angle of said flashlight apparatus.

33. A camera according to claim 32 wherein said light amount calculating circuit calculates the amounts of projection light for said projection domains using the results of photometry said divided photometry circuit has acquired within said light distribution angle of said flashlight apparatus when said light distribution angle of said flashlight apparatus is smaller than said angle of view of said photographic lens.

34. A camera according to claim 32 wherein said light amount calculating circuit calculates the amounts of projection light for said projection domains using the results of photometry said divided photometry circuit has acquired within said angle of view of said photographic lens when said light distribution angle of said flashlight apparatus is larger than said angle of view of said photographic lens.

35. A camera according to claim 32 wherein said light amount calculating circuit sets predetermined values as the amounts of projection light for projection domains when said light distribution angle of said flashlight apparatus is larger than said angle of view of said photographic lens and the difference exceeds a predetermined value.

* * * * *